United States Patent
Kitamura et al.

(10) Patent No.: US 8,031,490 B2
(45) Date of Patent: Oct. 4, 2011

(54) POWER SUPPLY CIRCUIT AND POWER SUPPLY SYSTEM

(75) Inventors: Hiroyasu Kitamura, Hirakata (JP); Mikihiro Yamashita, Eti (JP); Seiichi Iwao, Inukami (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 114 days.

(21) Appl. No.: 12/438,193

(22) PCT Filed: Aug. 21, 2007

(86) PCT No.: PCT/JP2007/066150
§ 371 (c)(1),
(2), (4) Date: Feb. 20, 2009

(87) PCT Pub. No.: WO2008/023679
PCT Pub. Date: Feb. 28, 2008

(65) Prior Publication Data
US 2010/0177537 A1    Jul. 15, 2010

(30) Foreign Application Priority Data
Aug. 25, 2006  (JP) ................................ 2006-228849

(51) Int. Cl.
*H02M 3/335*  (2006.01)
*H02M 1/10*  (2006.01)
(52) U.S. Cl. .................... 363/21.12; 363/56.11; 363/142
(58) Field of Classification Search ............... 363/21.12, 363/56.11, 142
See application file for complete search history.

(56) References Cited

U.S. PATENT DOCUMENTS

| | | | |
|---|---|---|---|
| 4,633,159 A | 12/1986 | Sakane et al. | |
| 5,771,162 A * | 6/1998 | Kwon | 363/56.11 |
| 5,835,361 A * | 11/1998 | Fitzgerald | 363/21.03 |
| 5,995,385 A * | 11/1999 | Shimamura | 363/21.16 |
| 6,094,362 A * | 7/2000 | Domingo | 363/56.1 |
| 6,788,556 B2 | 9/2004 | Hosotani et al. | |
| 7,012,816 B2 | 3/2006 | Amei | |
| 2003/0142521 A1 | 7/2003 | Hosotani et al. | |
| 2004/0252526 A1 | 12/2004 | Amei | |

FOREIGN PATENT DOCUMENTS

CN    1434562    8/2003
(Continued)

OTHER PUBLICATIONS

English language Abstract of 2003-284264, Oct. 3, 2003.
(Continued)

*Primary Examiner* — Shawn Riley
(74) *Attorney, Agent, or Firm* — Greenblum & Bernstein P.L.C.

(57) ABSTRACT

To provide a power supply circuit which can be applied worldwide without using a high withstand voltage switching element and can supply a load device with stable power. A charging section is arranged between a turn-off capacitor and a load coil. The charging section has the anode connected to the positive terminal of a feedback coil and the cathode connected to the cathode of a zener diode. Thus, when a voltage of a commercial power supply is high, the charging section operates, the turn-off capacitor is quickly charged, an on-period of a transistor is shortened, and an excessive voltage is prevented from being applied between the drain and the source of the transistor. At the same time, an output characteristic indicating relationship between the voltage of the commercial power supply and a current flowing in the load device is permitted to be flat.

16 Claims, 17 Drawing Sheets

FOREIGN PATENT DOCUMENTS

| | | |
|---|---|---|
| CN | 2760850 | 2/2006 |
| JP | 61-1228 | 1/1986 |
| JP | 6-284595 | 10/1994 |
| JP | 8-80042 | 3/1996 |
| JP | 10-94685 | 4/1998 |
| JP | 10-98880 | 4/1998 |
| JP | 3267730 | 1/2002 |
| JP | 2003-284264 | 10/2003 |
| JP | 2005-6477 | 1/2005 |

OTHER PUBLICATIONS

English language Abstract of 2005-6477, Jan. 6, 2005.
English language Abstract of 61-1228, Jan. 7, 1986.
English language Abstract of 10-94685, Apr. 14, 1998.
English language Abstract of 6-284595, Oct. 7, 1994.
English language Abstract of 8-80042, Mar. 22, 1996.
English language Abstract of 10-98880, Apr. 14, 1998.

* cited by examiner

POWER SUPPLY CIRCUIT AND POWER SUPPLY SYSTEM

TECHNICAL FIELD

The present invention relates to a self-oscillation type power supply circuit and a power supply system.

BACKGROUND ART

As overseas traveling has become more prevalent in recent years, there is a strong demand for the development of a power supply apparatus which can be used not only within the country but also in foreign countries where the voltage of the commercial power supply is different from that in the country, that is, a power supply which can be applied worldwide for charging appliances such as shavers, electric tooth brushes, and the like.

FIG. 17 is a circuit diagram to show a conventional power supply apparatus described in Patent Document 1. The power supply apparatus shown in FIG. 17 is a self-oscillation type power supply apparatus which operates as described below. First, when a power supply section E0 is connected, power is supplied to a capacitor C20 via a bias resistor R80 so that the capacitor C20 is charged and the gate voltage VG of an FET1 increases. Then, when the voltage VG exceeds a threshold voltage of the FET1, the FET1 turns on and a current ID flows. When the current ID increases and R40×ID exceeds a threshold voltage of a transistor Tr10, the transistor Tr10 turns on discharging the gate capacitance of the FET1. Consequently, the voltage VG decreases, the FET1 starts turning off and a coil current IL1 starts turning off as well. This will result in that the voltage VG rapidly decreases due to the voltage induced in a feedback winding L30 and the FET1 fully turns off.

When the FET1 turns off, the resonance circuit consisting of the capacitor C10 and a primary winding L10 will be in a free oscillation condition and the voltage VG exceeds the threshold voltage of the FET1 again due to the coil current IL1, causing the FET1 to turn on again. In this way, the on and off operations of the FET1 are repeated thereby supplying power to a load E20.

Then, since the FET1 is dominated by the voltage ID·R40 across the resistor R40, that is, by the current ID, excessive current will not flow even in a transient state so that the voltage VG will not be excessively decreased and the oscillation in the resonance circuit will be stabilized.

In addition, an RCC (Ringing Choke Converter) type power supply apparatus is disclosed in Patent Document 2 as a related art of the present invention.

However, since the power supply apparatus in Patent Document 1 is not configured to be worldwide applicable, when it is used in the countries or regions where the voltage of the power supply section E0 is large, the drain-to-source voltage of the FET1 becomes excessively large, which leads to a problem that an FET1 having a large drain-to-source withstand voltage needs to be adopted as the FET1.

On the other hand, since the switching power supply apparatus of Patent Document 2 is an RCC type, its switching element operates in a hard switching mode and, as the result of that, a problem arises in that more noise will be generated and the loss of power will increase. Further, since the switching power supply apparatus of Patent Document 2 is an RCC type and therefore the drain-source voltage of the switching element will not increase to the level of a resonance type even when it is used in the countries or regions where the power supply voltage is large, there is no need of decreasing the drain-source voltage of the switching element. Therefore, the above described problem, which arises in self-oscillation type power supply apparatuses, will not arise.

It is an object of the present invention to provide a power supply circuit and power supply system which can be applied worldwide without using a switching element having a large withstand-voltage and also can supply a stable power to load devices.

Patent Document 1: Japanese Patent Laid-Open No. 08-80042

Patent Document 2: Japanese Patent Laid-Open No. 10-98880.

DISCLOSURE OF THE INVENTION

The power supply circuit according to the present invention is configured to self-oscillate by supply of power from a power supply section, the power supply circuit being characterized by comprising: a resonance section including a resonance capacitor and a resonance coil, and for supplying power to the load device; an oscillation section including a first switching element connected in series to the resonance section and a feedback coil magnetically coupled to the resonance coil, and for turning on and off the first switching element to cause the resonance section to self-oscillate; a turn-off section including a second switching element, and a turn-off capacitor connected between a control terminal of the second switching element and a negative electrode of the power supply section, in which when an on-current which flows when the first switching element turns on reaches a predetermined level, the second switching element turns on to cause the first switching element to turn off; and a first charging section including a diode of which anode is connected to the feedback coil side, and a zener diode of which cathode is connected to the cathode of the diode and of which anode is connected to the turn-off capacitor side.

According to this configuration, there is provided a first charging section including a diode for inhibiting the flow of current toward the feedback coil from the turn-off capacitor, and a zener diode which operates when the voltage of the feedback coil exceeds a fixed value, between the feedback coil and the turn-off capacitor. As the result of this, when a large voltage is outputted from the power supply section, the voltage of the feedback coil exceeds a fixed value and the first charging section operates thereby supplying current to the turn-off capacitor. This will enable that the turn-off capacitor is charged with an on-current of the first switching element and a current supplied from the first charging section during an on-period of the first switching element, to quickly turn on the second switching element and quickly turn off the first switching element. As a result, the on-period of the first switching element is decreased thereby reducing the energy stored in the resonance section, enabling to suppress the increase of the output current to be passed through the load device. By this configuration, an output characteristic, which indicates the relationship between the voltage outputted from the power supply section and the output current passed through the load device when the output voltage represented by the abscissa axis and the output current represented by the ordinate axis, becomes flat thus enabling to provide a worldwide applicable power supply circuit.

Further, since when the voltage outputted from the power supply section is high, the turn-off capacitor will be quickly charged by the operation of the first charging section, the on-period of the first switching element decreases thus enabling to prevent an excessive voltage from being applied to the first switching element.

Further, since the first charging section comprises a diode for inhibiting the current from flowing from the turn-off capacitor toward the feedback coil, the charge quantity to be stored in the turn-off capacitor when the first switching element turns on is made to be constant and thereby the charging time of the turn-off capacitor becomes constant, enabling to maintain the on-period of the first switching element to be constant thereby supplying stable power to the load device.

BEST MODE FOR CARRYING OUT THE INVENTION

Hereinafter, the power supply system according to the embodiments of the present invention will be described.

Embodiment 1

Figure 1:
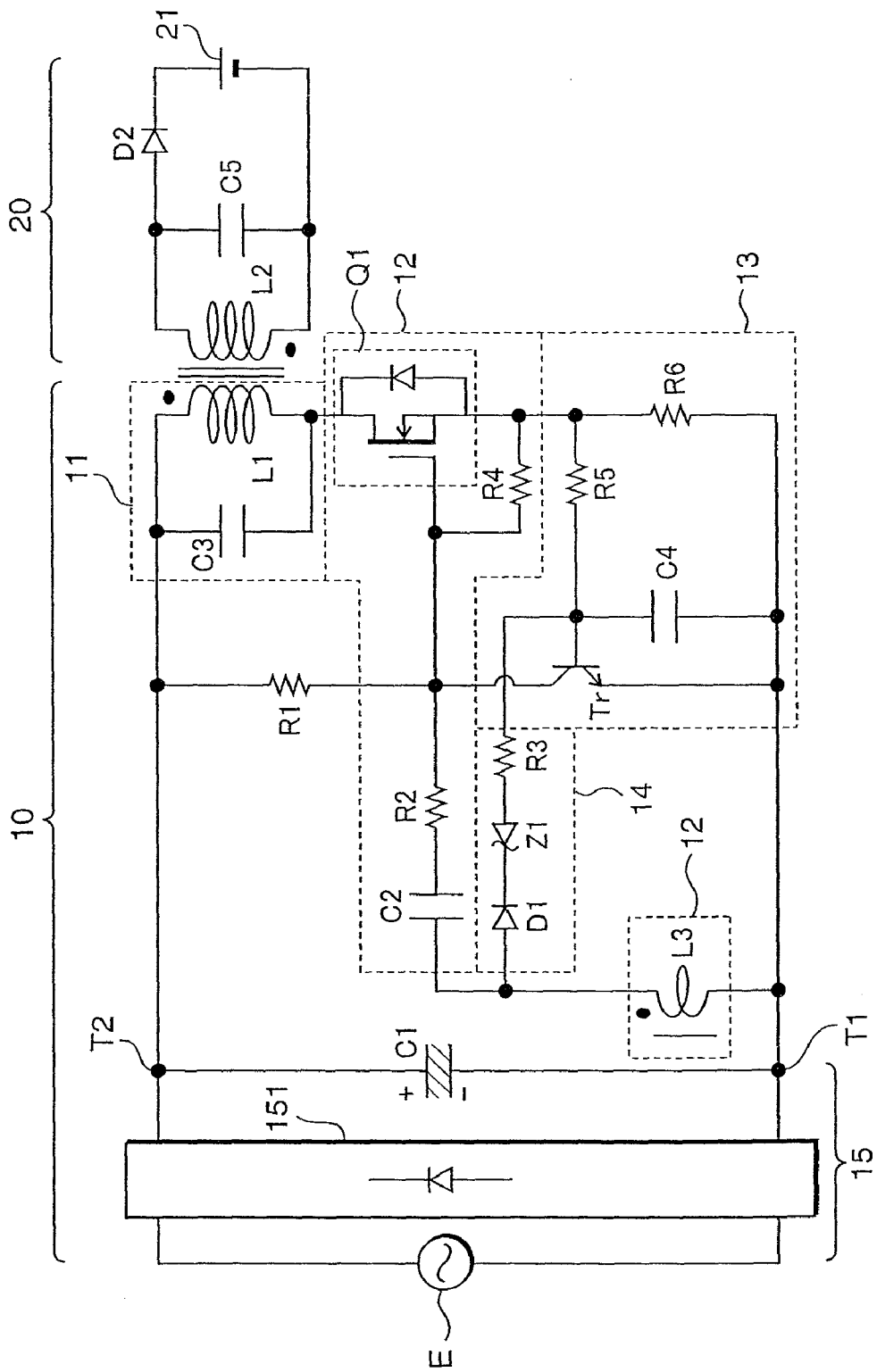
FIG. 1 is a circuit diagram of the power supply system according to Embodiment 1 of the present invention.

FIG. 1 shows a circuit diagram of the power supply system according to Embodiment 1 of the present invention. The power supply system comprises a power supply circuit 10 and a load device 20. The power supply circuit 10 comprises a resonance section 11, an oscillation section 12, a turn-off section 13, a charging section 14 (first charging section), and a power supply section 15.

The resonance section 11 comprises a resonance coil L1 and a resonance capacitor C3, which are connected in parallel, and supplies power to the load device.

The resonance section 12 comprises a feedback coil L3, a capacitor C2, a resistor R2, and a transistor Q1 (first switching element), and a resistor R4, and causes the resonance section 11 to self oscillate. The feedback coil L3 is magnetically coupled with the resonance coil L1 so that the gate side terminal of the transistor Q1 has positive polarity. Hereafter, the gate side terminal of the transistor Q1 of the feedback coil L3 is referred to as a positive terminal, and the terminal opposite to the positive terminal is referred to as a negative terminal. The negative terminal of the feedback coil L3 is connected with the negative electrode T1 of the power supply section 15. One end of resonance coil L1 is connected to the drain of transistor Q1.

The transistor Q1 is made up of an n-channel field effect transistor, of which the drain is connected to the resonance section 11, of which the source to the turn-off section 13, and of which the gate (control terminal) to the positive terminal of the feedback coil L3 via the resistor R2 and the capacitor C2. Further, there is connected between the gate and source of the transistor Q1 a resistor R4 for preventing an excessive voltage from being outputted to the gate.

The capacitor C2 is connected at one end to the negative electrode T1 of the power supply section 15 via the feedback coil L3 and at the other end to the gate of the transistor Q1 via the resistor R2. Thus, a flow of a current from a starting resistor R1 to the feedback coil L3 is blocked by the capacitor C2 and the resistor R2.

The turn-off section 13 comprises a turn-off transistor Tr (second switching element), a turn-off capacitor C4, and resistors R5 and R6, and is configured such that the turn-off capacitor C4 is charged with the drain current (on current) which flows when the transistor Q1 turns on, and when the voltage of the turn-off capacitor C4 exceeds a threshold voltage of the turn-off transistor Tr, the turn-off transistor Tr turns on causing the transistor Q1 to turn off.

The turn-off capacitor C4 is connected at one end to the negative electrode T1 and at the other end to the base (control terminal) of the turn-off transistor Tr.

The turn-off transistor Tr is made up of an npn bipolar transistor in which the emitter is connected to the negative electrode T1 of the power supply section 15, a turn-off capacitor C4 is connected in parallel between the base and emitter, and the collector is connected to the positive electrode T2 of the power supply section 15 via the starting resistor R1. Then, the turn-off transistor Tr turns on when the voltage of the turn-off capacitor C4 exceeds a threshold voltage so that the gate capacitance of the transistor Q1 is discharged thereby causing the transistor Q1 to turn off. This makes it possible to prevent an excessive drain current from flowing to the transistor Q1 thereby protecting the transistor Q1.

The resistor R6 is connected at one end to the negative electrode T1 and at the other end to the base of the transistor Tr via the resistor R5 and is configured such that a voltage in response to the drain current which flows when the transistor Q1 turns on is outputted to the turn-off capacitor C4 via the resistor R5 thereby charging the turn-off capacitor C4.

The charging section 14 comprises a diode D1, a zener diode Z1, and a resistor R3, and is configured to operate when a voltage larger than a fixed value is outputted from the power supply section 15, to charge the turn-off capacitor C4. The diode D1 is connected at its anode to the positive terminal of the feedback coil L3. The zener diode Z1 is connected at its cathode to the cathode of the diode D1 and at its anode to the turn-off capacitor C4 via the resistor R3.

The power supply section 15 is made up of a rectifier circuit 151 and a capacitor C1, and is adapted to convert alternating voltage from a commercial power supply E into direct-current voltage. The commercial power supply E outputs alternating voltage with an amplitude of 80 to 246V. The rectifier circuit 151 is made up of for example a diode bridge circuit and is adapted to full-wave rectify the alternating voltage outputted from the commercial power supply E. The capacitor C1 is made up of for example an electrolytic capacitor, and performs the smoothing of the voltage that has been full-wave rectified by the rectifier circuit 151 to create a direct-current voltage.

The load device 20 comprises a load coil L2, a capacitor C5 connected in parallel to the load coil L2, a diode D2 of which anode is connected to the capacitor C5, and a secondary battery 21 of which positive electrode is connected to the cathode of the diode D2 and the negative electrode to the capacitor C5.

The load coil L2 is magnetically coupled with the resonance coil L1 so that the negative electrode side of the secondary battery 21 has a positive polarity. Here, the resonance coil L1 and the load coil L2 are connected in a noncontact manner via an insulator which is not shown in the figure. It is noted that the resonance coil L1 and the load coil L2 make up a transformer in which the resonance coil L1 serves as the primary winding and the load coil L2 serves as the secondary winding.

The capacitor C5 performs the smoothing of the voltage outputted from the load coil L2, and the diode D2 rectifies the voltage outputted from the load coil L2. As the result of this, a constant charging current flows in the secondary battery 21. The secondary battery 21 is made up of a lithium ion secondary battery, a nickel-cadmium secondary battery, or the like.

Figure 2:
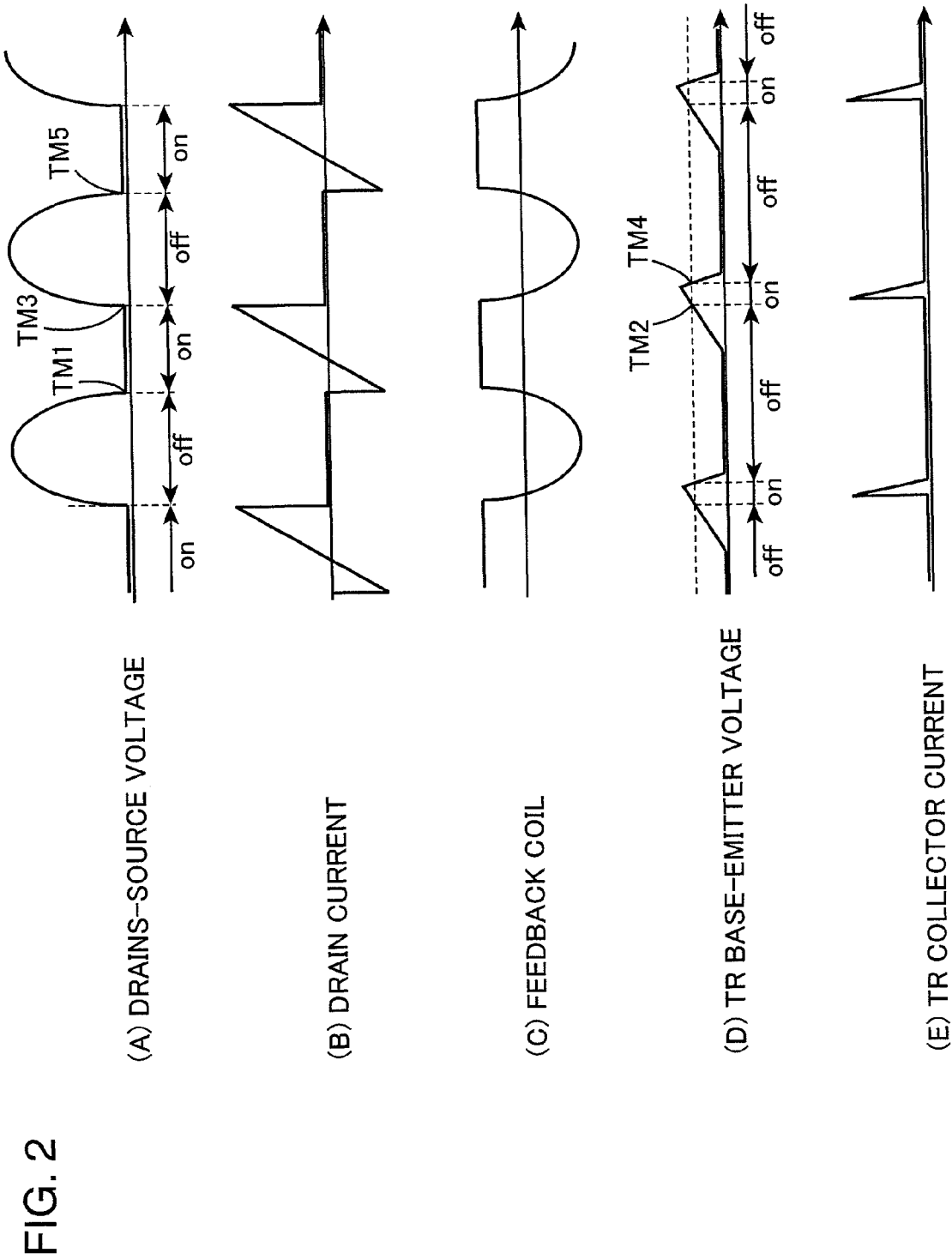
FIG. 2 is a timing chart of the power supply system shown in FIG. 1, in which (A) shows the drain-source voltage of a transistor Q1, (B) the drain current, (C) the voltage of a feedback coil, (D) the base-emitter voltage of a turn-off transistor Tr, and (E) the collector current of the turn-off transistor Tr.

Next, the operation of the power supply system shown in FIG. 1 will be described. FIG. 2 shows a timing chart of the power supply system shown in FIG. 1, in which (A) shows the drain-source voltage of a transistor Q1, (B) the drain current, (C) the voltage of a feedback coil L3, (D) the base-emitter voltage of a turn-off transistor Tr, and (E) the collector current of the turn-off transistor Tr. Hereinafter, the operation of the present power supply system will be described with reference to the circuit diagram of FIG. 1 and the timing chart of FIG. 2.

A voltage of AC 80 to AC 264 V outputted from the commercial power supply E is rectified in the rectifier circuit 151 and smoothed by the capacitor C1 to become a direct-current voltage of DC 113 to DC 374 V. When the voltages of the feedback coil L3 and the capacitor C1 increase, a current flows in the starting resistor R1 and a voltage starts to be applied to the gate of the transistor Q1. When the gate voltage of the transistor Q1 exceeds a threshold voltage of the transistor Q1, the transistor Q1 turns on (at time TM1) and a current starts flowing in the resonance capacitor C3 and the resonance coil L1.

At this moment, as shown in FIG. 2(B), a drain current starts flowing in the transistor Q1 and a current starts flowing in the resonance coil L1. When a current starts flowing in the resonance coil L1, a voltage is generated in the feedback coil L3 magnetically coupled with the resonance coil L1 as well, and the transistor Q1 maintains an on-state due to the directional property of the resonance coil L1. Further, when the transistor Q1 turns on, a voltage begins to be generated in the resistor R6 due to the drain current, and the turn-off capacitor C4 is charged.

At the same time, a positive voltage occurs at the positive terminal of the feedback coil L3 and when the voltage of the commercial power supply E is larger than a fixed value, the charging section 14 operates causing a current to flow in the turn-off capacitor C4 via the diode D1, the zener diode Z1, and the resistor R3 thereby charging the turn-off capacitor C4. That is, since the turn-off capacitor c4 is charged by the voltage generated at the charging section 14 and the resistor R6, it is possible to quickly turn on the turn-off transistor Tr.

When the voltage of the turn-off capacitor c4 rises up to a threshold voltage of the turn-off transistor Tr (at time TM2), the turn-off transistor Tr turns on thereby discharging the gate capacitance of the transistor Q1 and the transistor Q1 turns off (at time TM3).

At this moment, due to the existence of the turn-off capacitor C4, the turn-off transistor Tr maintains an on-state for a while until after time TM4 and a negative voltage occurs at the positive terminal of the feedback coil L3 so that the transistor Q1 maintains an off-state. At this moment, the current which has been flowing in the resonance coil L1 is passed to the resonance capacitor C3, and a resonance starts between the leakage inductance of the resonance coil L1 and the resonance capacitor C3 so that the voltage between the drain and source of the transistor Q1 varies in an upwardly convex curve as shown in FIG. 2(A). Further, along with this, the voltage of the feedback coil L3 varies in a downwardly convex curve.

Moreover, in the present embodiment, the resonance coil L1 and the load coil L2 are loosely coupled and form an exciting inductance and a leakage inductance in the resonance coil L1. In a short time after the resonance has started, a positive voltage occurs at the positive terminal of the feedback coil L3 so that the transistor Q1 turns on again (at time TM5). It is noted that the capacitance of the turn-off capacitor C4 and the resistance values of the resistors R5, R6 are determined in such a way that all or a fixed amount of the charge stored in the turn-off capacitor C4 is discharged through the resistor R5 and the resistor R6 in an on-period of the transistor Q1 when the transistor Q1 turns on.

Figure 3:
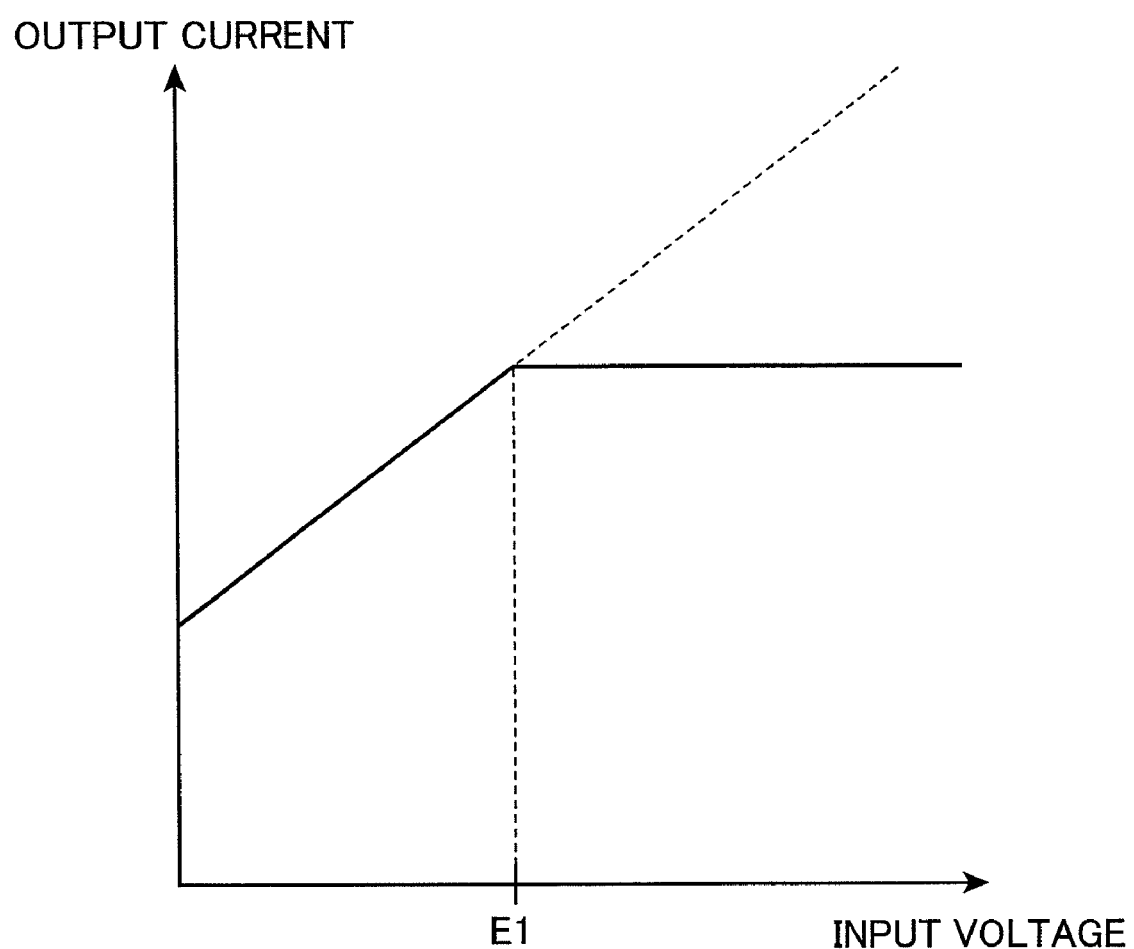
FIG. 3 is a graph to show the output characteristic of the present power supply system in which the ordinate axis indicates output current and the abscissa axis indicates input voltage.

FIG. 3 is a graph to show the output characteristic of the present power supply system, in which the ordinate axis indicates output current and the abscissa axis indicates input voltage. The graph by solid line indicates the output characteristic when the charging section 14 is adopted, and the graph by dotted line indicates the output characteristic when the charging section 14 is not adopted. The output current indicates the charging current which flows in the secondary battery 21 of the load device 20, and the input voltage indicates the voltage outputted by the commercial power supply E. Further, E1 indicates the voltage of the commercial power supply E when a voltage corresponding to the threshold at which the charging section 14 starts operation is applied to the positive terminal of the feedback coil L3.

Now letting the number of windings of the resonance coil L1 be N1, the number of windings of the feedback coil L3 be N3, and the voltage outputted by the commercial power supply E be E, and provided that the resonance coil L1 and the feedback coil L3 are fully coupled, a voltage of E×N3/N1 occurs at the feedback coil L3. Then, when the voltage (E×N3/N1) occurring at the feedback coil L3 becomes higher than the breakdown voltage VZ1 of the zener diode Z1, the charging section 14 operates.

Figure 6:
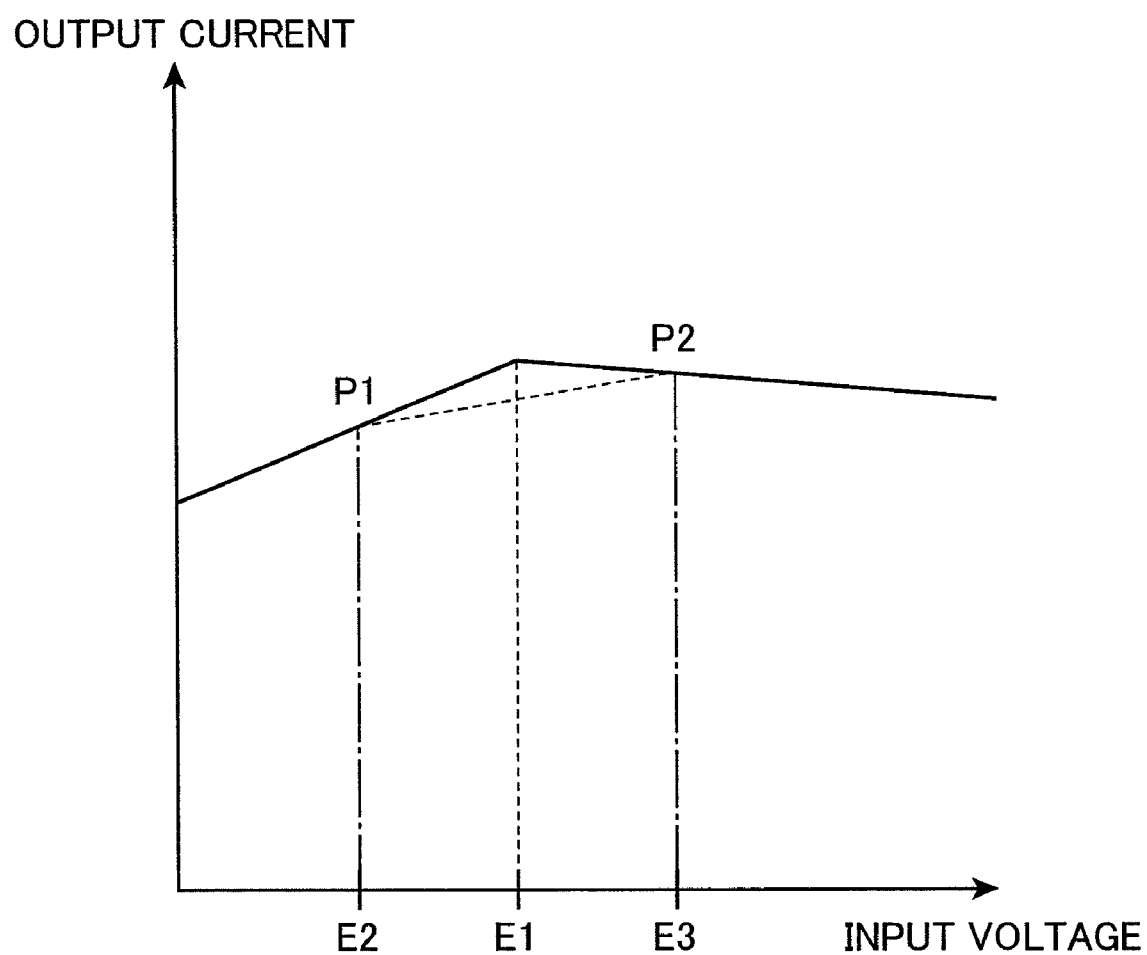
FIG. 6 is a graph to show the output characteristic of the present power supply system in which the ordinate axis indicates output current and the abscissa axis indicates input voltage.

As the result of this, the charging current, which is supposed to increase as shown by a dotted line in FIG. 3, will be suppressed as shown by solid line so that increase of the charging current is significantly suppressed in a range of voltage higher than E1. That is, although, as the voltage of the commercial power supply E increases, the current which flows in the charging section 14 will increase, this will result in reduction of the on-period of the transistor Q1 and thus reduction of the energy stored in the resonance section 11 during an on-period so that increase in the output current will be suppressed. It is noted that since the gradient of the output current in the high voltage range shown in FIG. 3 can be adjusted by adjusting the resistance value of the resistor R3, it becomes possible to make the output current remain substantially constant or slowly decrease as shown in FIG. 6.

Next, consider a case in which the charging section 14 does not comprise the diode D1. In this case, since a negative voltage occurs in the feedback coil L3 as shown in FIG. 2(C) during the off-period of the transistor Q1, the charge of the turn-off capacitor C4 will be discharged to the feedback coil L3 side as well. Then, since the negative voltage which occurs at the feedback coil L3 varies with time and therefore is unstable, the amount of electric charge to be discharged will become unstable as well, and there is a risk that the remaining capacitance of the turn-off capacitor C4 when the transistor Q1 turns on will not be constant. For that reason, it becomes difficult to make the turn-off capacitor C4 discharge a fixed amount of charge each time, and thus the on-period of the transistor Q1 becomes unstable.

On the other hand, in the present power supply system, the charging section 14 comprises a diode D1 of which anode is connected to the positive terminal of the feedback coil L3. For that reason, in an off-period of the transistor Q1, the electric charge stored in the turn-off capacitor C4 will be discharged only from the resistors R5, R6 and a discharge through the charging section 14 will be inhibited. As the result of that, when the transistor Q1 turns on, the charge stored by the turn-off capacitor C4 will be zero or a fixed value, thus enabling to make the on-period of the transistor Q1 be constant.

As so far described, according to the power supply system of Embodiment 1, since it comprises a charging section 14, it becomes possible to control the output current to be within a certain range regardless of the magnitude of voltage of a commercial power supply E, thereby providing a worldwide applicable power supply circuit 10. Further, since it comprises a charging section 14, and the on-period of the transistor Q1 decreases as the voltage of the commercial power supply E increases, it becomes possible to prevent an excessively large voltage from being applied to the transistor Q1. Furthermore, since the charging section 14 comprises a diode D1 of which anode is connected to the positive terminal of a feedback coil L3, a discharge through the charging section 14 from the turn-off capacitor C4 is inhibited making it possible that the on-period of the transistor Q1 is stabilized and thus the power to be supplied to the load device 20 is stabilized.

Embodiment 2

Figure 4:
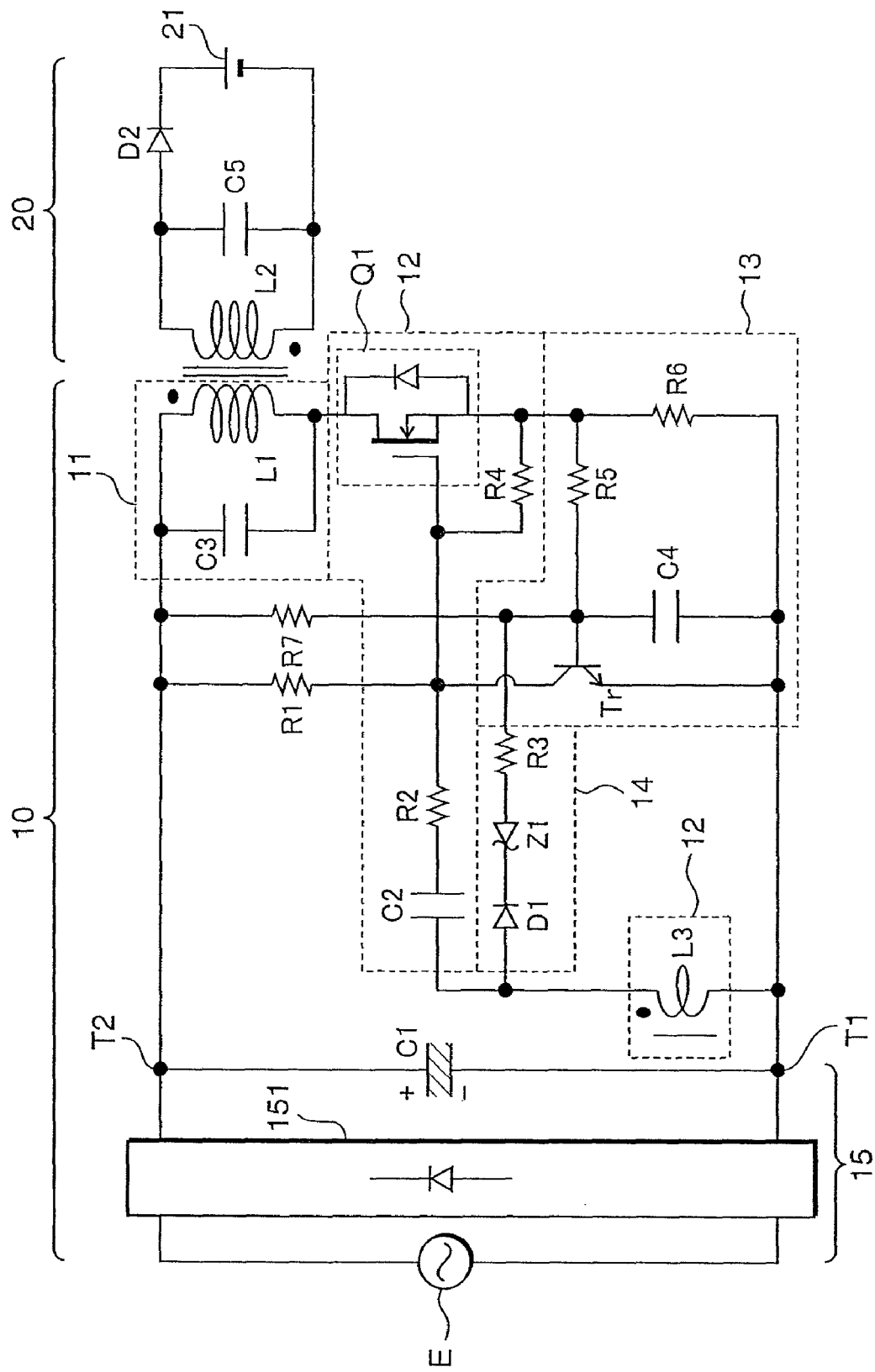
FIG. 4 is a circuit diagram of the power supply system according to Embodiment 2 of the present invention.

Next, the power supply system according to Embodiment 2 of the present invention will be described. FIG. 4 shows a circuit diagram of the power supply system according to Embodiment 2 of the present invention. In is noted that in FIG. 4, like parts of those of Embodiment 1 are given like reference characters and the description thereof will be omitted. The power supply system according to Embodiment 2 is characterized in that a resistor R7 is connected between the positive electrode T2 and the base of the turn-off transistor Tr.

Since voltage inputted from the commercial power supply E will cause a current to flow in the turn-off capacitor C4 via the resistor R7, a partial voltage between the resistor R7 and the combined resistor of resistors R5 and R6 is always outputted to the turn-off capacitor C4. Accordingly, as the voltage of the commercial power supply E increases, the voltage outputted to the turn-off capacitor C4 will increase, thus enabling that the on-period of the transistor Q1 is controlled depending on the voltage of the commercial power supply E to control the output to the load device 20.

Further, since the turn-off capacitor C4 is supplied with current not only via the charging section 14 but also via the resistor R7, the turn-off capacitor C4 can quickly turn on the turn-off transistor Tr thereby decreasing the on-period of the transistor Q1, making it possible to adopt a transistor having a low withstand-voltage as the transistor Q1.

As so far described, according to the power supply system of Embodiment 2, it becomes possible to control the output to the load device 20 by adjusting the voltage of the commercial power supply E and to prevent an excessive voltage from being applied to the transistor Q1.

Embodiment 3

Figure 5:
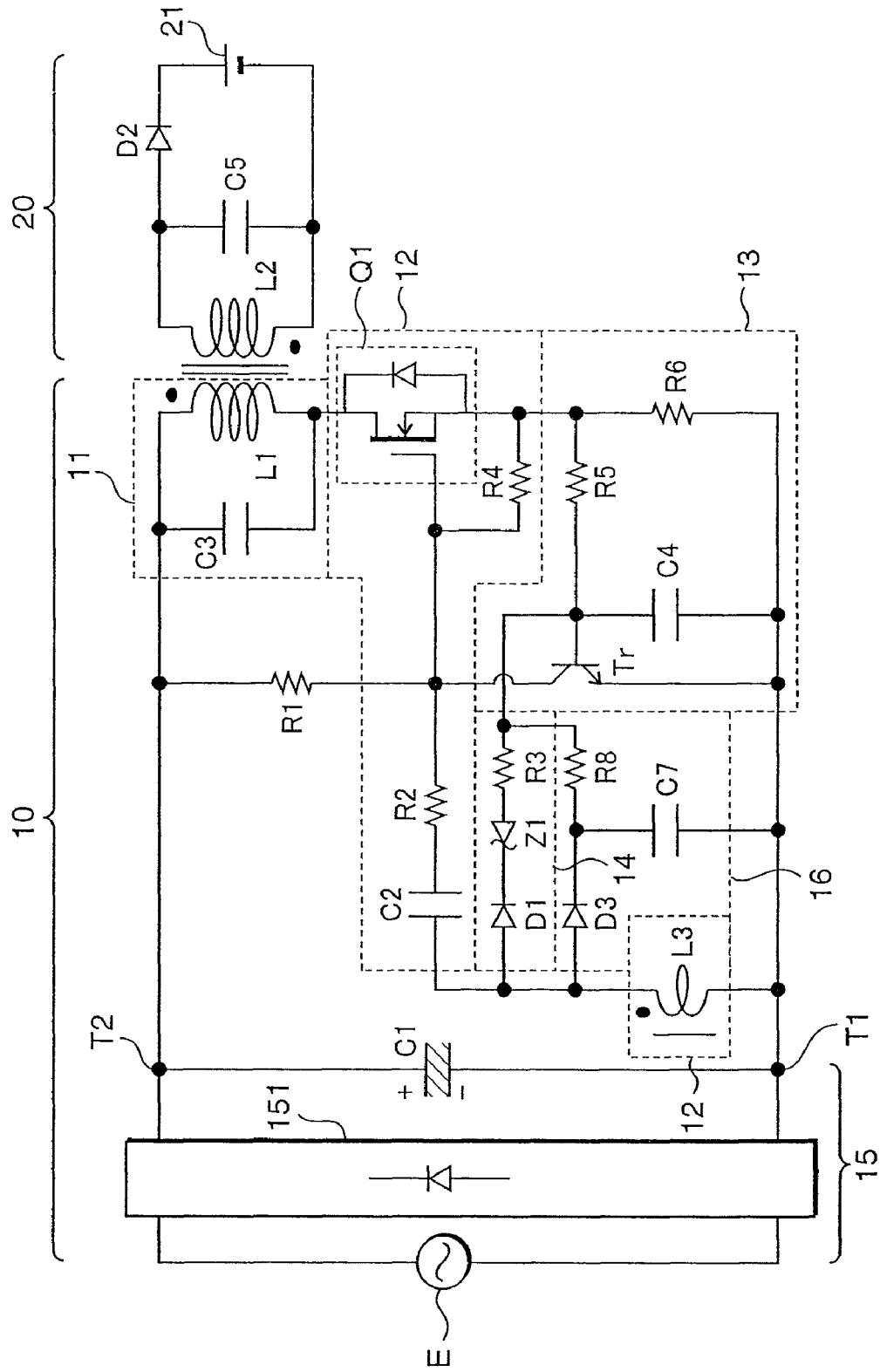
FIG. 5 is a circuit diagram of the power supply system according to Embodiment 3 of the present invention.

Next, the power supply system according to Embodiment 3 of the present invention will be described. FIG. 5 shows a circuit diagram of the power supply system according to Embodiment 3 of the present invention. In is noted that in FIG. 5, like parts of those of Embodiments 1 and 2 are given like reference characters and the description thereof will be omitted. The power supply system according to Embodiment 3 is characterized in that a smoothing section 16 is connected in parallel to the charging section 14 in the power supply system of Embodiment 1. The smoothing section 16 comprises a diode D3, a capacitor C7, and a resistor R8. The diode D3 is connected at its anode to the positive terminal of the feedback coil L3 and at its cathode to the base of the turn-off transistor Tr via the resistor R8 and to the negative electrode T1 via the capacitor C7.

The smoothing section 16 performs the smoothing of the voltage of the feedback coil L3 to generate a voltage corresponding to the power supply voltage. As the result of this, the turn-off capacitor C4 is charged through two paths: the charging section 14 and the smoothing section 16. For that reason, a voltage in which ripples contained in the voltage generated in the capacitor C1 has been reduced is outputted to the turn-off capacitor C4 so that the time till the turn-off transistor Tr turns on is stabilized and the on-period of the transistor Q1 is stabilized, thereby enabling the resonance section 11 to produce a stable oscillation.

FIG. 6 is a graph to show the output characteristic of the power supply system in Embodiment 3, in which the ordinate axis indicates output current and the abscissa axis indicates input voltage. It is noted that the solid line indicates the output characteristic of Embodiment 3 and the dotted line indicates the output characteristic of Embodiment 4. The output current indicates the charging current which flows in the secondary battery 21 of the load device 20, and the input voltage indicates the voltage of the commercial power supply E. As shown in FIG. 6, it is seen that when the smoothing section 16 is provided, the gradient in a low voltage range of voltages up to E1 becomes gentle compared with the graph shown in FIG. 3. Thereby, it is possible to control the output current to be within a fixed range regardless of the magnitude of the voltage outputted by the commercial power supply E.

As so far described, according to the charging system of Embodiment 3, since it comprises the smoothing section 16, a stable voltage is outputted to the turn-off capacitor C4 thereby providing a more flat output characteristic, making it possible to provide a power supply system more suitable for worldwide application.

Embodiment 4

Figure 7:
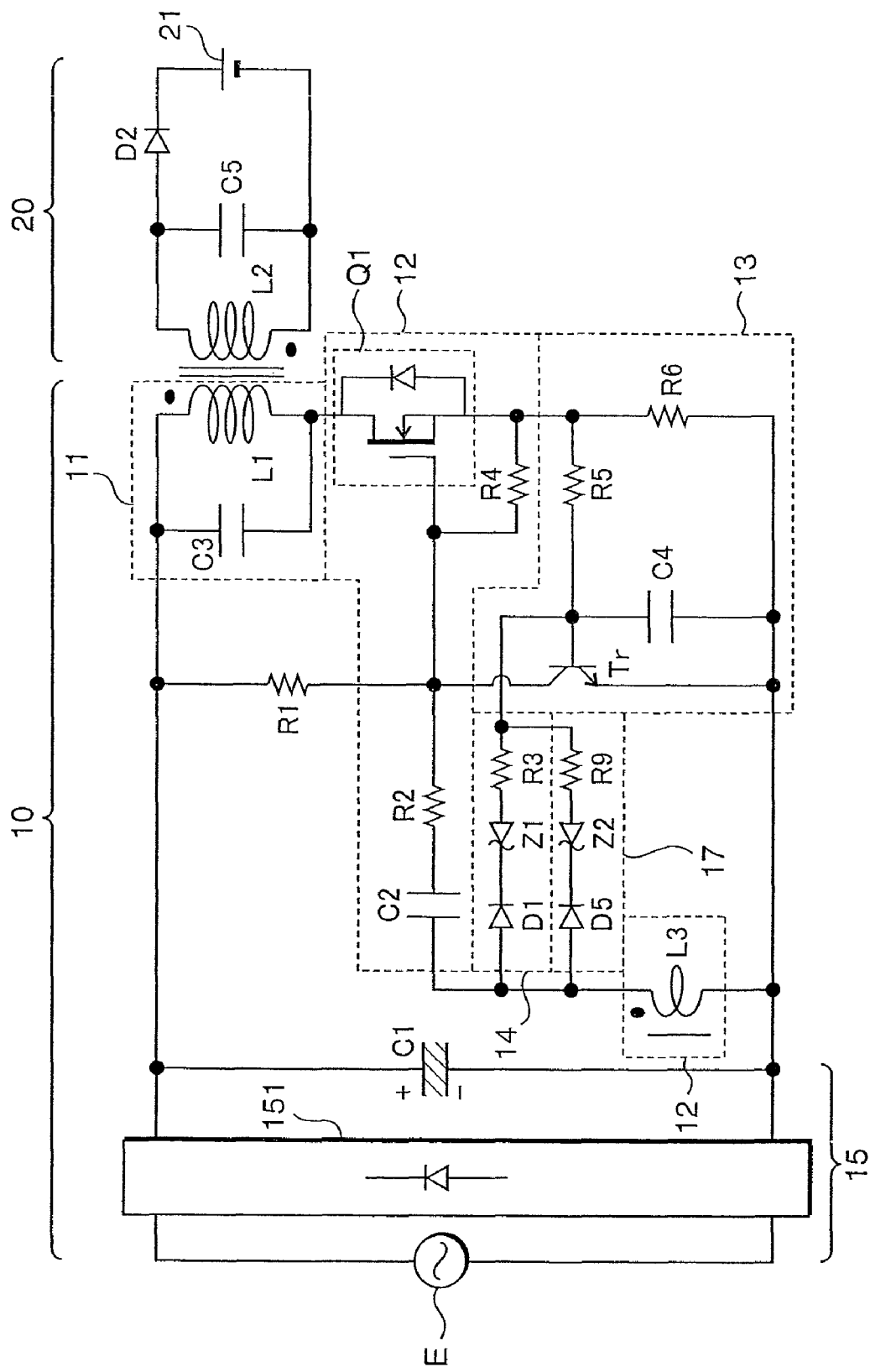
FIG. 7 is a circuit diagram of the power supply system according to Embodiment 4 of the present invention.

Next, the power supply system according to Embodiment 4 of the present invention will be described. FIG. 7 shows a circuit diagram of the power supply system according to Embodiment 4 of the present invention. It is noted that in FIG. 7, like parts of those of Embodiments 1 to 3 are given like reference characters and the description thereof will be omitted. The power supply system according to Embodiment 4 is characterized in that a charging section 17 is provided in place of the smoothing section 16 in the power supply system of Embodiment 3, that is, the turn-off capacitor C4 is charged by using two charging sections 14 and 17.

The charging section 17, which has a similar configuration with the charging section 14, comprises a diode D5, a zener diode Z2, and a resistor R9. The diode D5 is connected at its anode to the positive terminal of the feedback coil L3 and at its cathode to the cathode of the zener diode Z2. The zener diode Z2 is connected at its anode to the base of the turn-off transistor Tr via the resistor R9.

Now suppose that the breakdown voltage VZ2 of the zener diode Z2 is larger than the breakdown voltage VZ1 of the zener diode Z1. As the result of this, when the voltage of the positive terminal of the feedback coil L3 is less than VZ1, the charging sections 14, 17 will not operate; when the voltage of the positive terminal of the feedback coil L3 is not less than VZ1 and less than VZ2, the charging section 14 operates alone; and when the voltage of the positive terminal of the feedback coil L3 not less than VZ2, the charging section 14 and the charging section 17 operate together.

As the result of this, as shown in the graph by a dotted line of FIG. 6, two inflection points P1 and P2 will appear in the output characteristic. That is, when the voltage of the commercial power supply E is less than E2 and the voltage of the positive terminal of the feedback coil L3 is less than the breakdown voltage VZ1, the charging sections 14, 17 will not operate. Further, when the voltage of the commercial power supply E is not less than E2 and less than E3 and the voltage of the positive terminal of the feedback coil L3 is not less than the breakdown voltage VZ1 and less than the breakdown voltage VZ2, the charging section 14 operates alone. By this configuration, the turn-off capacitor 4 is charged by the charging section 14, as the result of which the on-period will be decreased for that part and the output current will be reduced. For that reason, the output characteristic exhibits a gentler gradient in a middle voltage range from E2 to E3 than in a low voltage region.

Further, when the voltage of the commercial power supply E is not less than E3 and the voltage of the positive terminal of the feedback coil L3 is more than the breakdown voltage VZ2, the charging section 17 operate in addition to the charging section 14. By this configuration, the turn-off capacitor C4 is charged from two paths of the charging section 14 and the charging section 17, as the result of which the on-period is further decreased for that part, and the output current will be reduced. For that reason, the output characteristic exhibits a gentler gradient in a high voltage range than in a middle voltage range.

As so far described, according to the power supply system of Embodiment 4, since the charging section 17 is provided in addition to the charging section 14, the output characteristic varies in two stages further reducing the variation range of the output current and providing a further flat output characteristic, as the result of which it becomes possible to provide a power supply system more suitable for worldwide application.

It is noted that although two charging sections 14 and 17 are provided in the power supply system according to Embodiment 4, this is not limiting and three or more charging sections may be provided. In such a case, setting the breakdown voltage of the zener diode provided in each charging section to be a different value will allow to obtain an output characteristic having inflection points in accordance with the number of the charging sections, thereby providing a further flat output characteristic. Furthermore, by adjusting the number of charging sections and the value of the breakdown voltage of the zener diode, it is made possible to adjust the output characteristic so that a desired output current is obtained in the voltage range of the targeted commercial power supply E.

Embodiment 5

Figure 8:
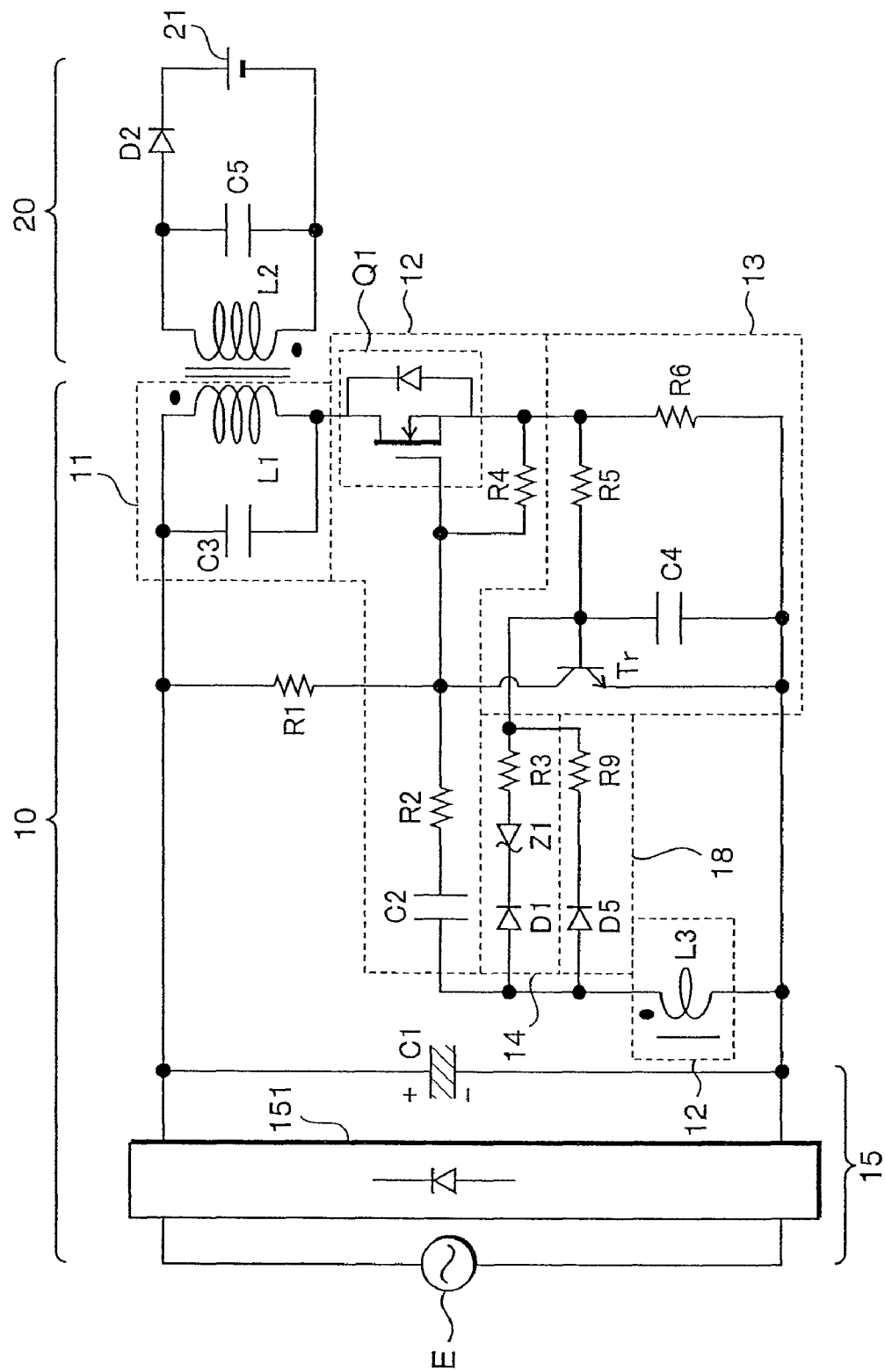
FIG. 8 is a circuit diagram of the power supply system according to Embodiment 5 of the present invention.

Next, the power supply system according to Embodiment 5 of the present invention will be described. FIG. 8 shows a circuit diagram of the power supply system according to Embodiment 5. It is noted that in FIG. 8, like parts of those of Embodiments 1 to 4 are given like reference characters and the description thereof will be omitted. The power supply system according to Embodiment 5 is characterized by comprising a charging section 18 in which the zener diode Z2 of the charging section 17 is omitted in the power supply system in Embodiment 4.

Since the charging section 18 does not include the zener diode Z2, it operates even when the voltage of the commercial power supply E is low and the charging section 14 does not operate, thereby charging the turn-off capacitor C4. For that reason, the power supply system exhibits an output characteristic having a gentler gradient in a lower voltage range thereby providing a more flat output characteristic.

On the other hand, when the commercial power supply E outputs a high voltage such as to cause the charging section 14 to operate, an increase in the output current in a high voltage range will be suppressed similarly to the Embodiment 1 thereby providing a flat output characteristic.

As so far described, according to the power supply system of Embodiment 5, since a charging section 18 is provided, it can obtain a flat output characteristic in a lower voltage range thereby allowing to provide a power supply system more suitable for worldwide application.

Embodiment 6

Figure 9:
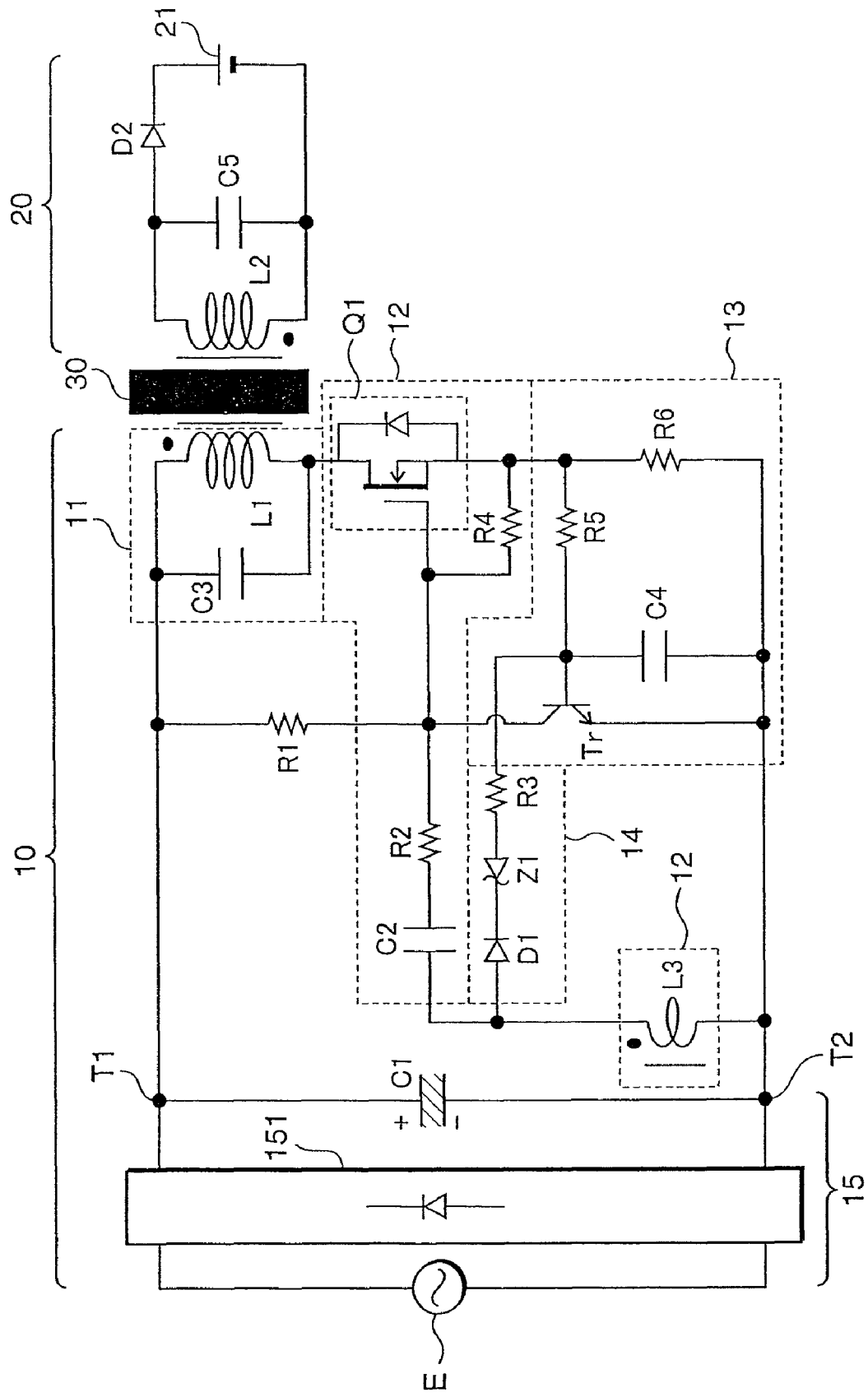
FIG. 9 is a circuit diagram of the power supply system according to Embodiment 6 of the present invention.

Next, the power supply system according to Embodiment 6 of the present invention will be described. FIG. 9 shows a circuit diagram of the power supply system according to Embodiment 6. It is noted that in FIG. 9, like parts of those of Embodiments 1 to 5 are given like reference characters and the description thereof will be omitted. The power supply system according to Embodiment 6 is characterized in that the power supply circuit 10 and the load device 20 are connected via a housing 30 in the power supply system in Embodiment 1.

The housing 30 is configured such that the resonance coil L1 and the load coil L2 are insulated from each other and the magnetic flux generated at the resonance coil L1 is interlinked with the load coil L2 so that power is transmitted through electromagnetic induction. By this configuration, the power supply circuit 10 charges the secondary battery 21 in a non-contact manner. As the housing 30, the enclosure of the power supply circuit 10 and the enclosure of the load device 20 may be adopted. Further, a mounting section for mounting the load device 20 onto to the enclosure of the power supply circuit 10 is provided and the resonance coil L1 and the load coil L2 may be arranged such that the resonance coil L1 and the load coil L2 are magnetically coupled when the load device 20 is mounted onto the mounting section.

When the load device 20 is removed from the power supply circuit 10, the exciting inductance will become a linkage inductance at the resonance coil L1, and the linkage inductance will become larger compared with the case in which the load device 20 is attached, as the result of which the resonance voltage increases accordingly and the drain voltage of the transistor Q1 increases as well. However, since the power supply system according to Embodiment 6 comprises the charging section 14, and the charging section 14 operates even when the resonance voltage becomes large, thereby reducing the on-period of the transistor Q1, there will be no need of using a transistor having a large withstand voltage as the transistor Q1 and a flat output characteristic will be obtained.

As so far being described, according to the power supply system of Embodiment 6, since the housing 30 is provided, it becomes possible to charge the secondary battery 21 in a noncontact manner. Moreover, since even when the load device 20 is removed and the resonance voltage increases, the charging section 14 operates thereby reducing the on-period of the transistor Q1, the transistor Q1 will not be subjected to a large voltage for a long period of time thus enabling to protect the transistor Q1. As the result of that, there will be no need of using a transistor having a high withstand voltage as the transistor Q1 thereby allowing to reduce the size and cost of the circuit.

Embodiment 7

Figure 10:
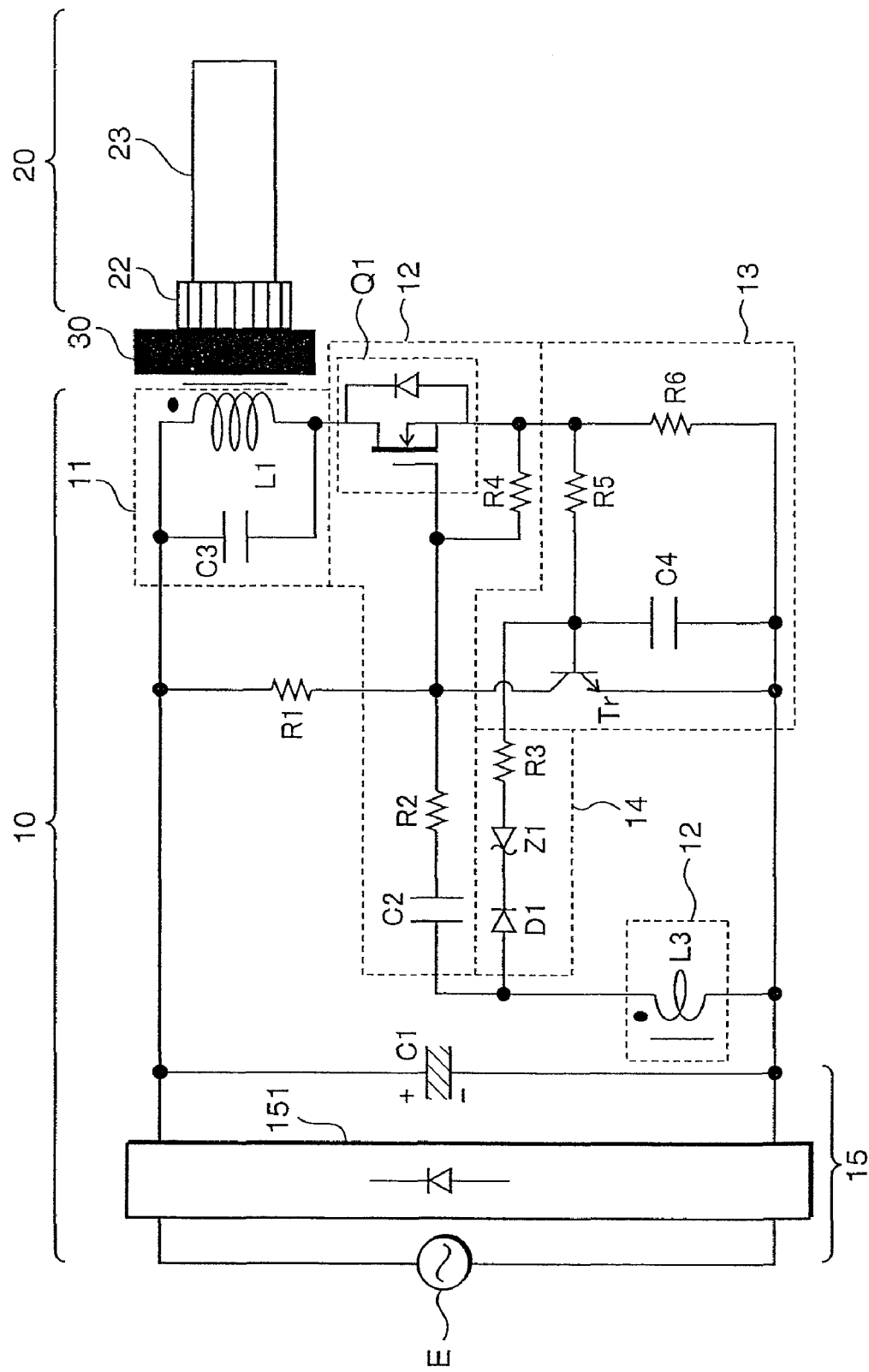
FIG. 10 is a circuit diagram of the power supply system according to Embodiment 7 of the present invention.

Next, the power supply system according to Embodiment 7 of the present invention will be described. FIG. 10 shows a circuit diagram of the power supply system according to Embodiment 7. It is noted that in FIG. 10, like parts of those of Embodiments 1 to 6 are given like reference characters and the description thereof will be omitted. The power supply system according to Embodiment 7 is characterized in that a shaver is adopted as the load device 20, and the power supply circuit 10 supplies power to the shaver thereby heating the blade face 22.

The shaver comprises a blade face 22 and a body section 23. The blade face 22 is made of metal and comes into contact with the skin to shave the hair grown on the skin when a person shaves beard. The body section 23 comprises various circuits for controlling the shaver.

The housing 30 is made up of an enclosure of the power supply circuit 10 and insulates the resonance coil L1 from the blade face 22. The power supply circuit 10, which is similar to the power supply circuit 10 of Embodiment 1, causes the magnetic flux generated at the resonance coil L1 to be interlinked with the blade face 22, and an eddy current to flow in the blade face 22 thereby heating the blade face 22. The blade face 22 has a small thickness of about 100 nm and its coupling is loose as with a metal pan. Therefore, most of the inductance becomes linkage inductance, as the result of which the resonance coil L1 will have a high resonance voltage, and the drain voltage of the transistor Q1 inevitably becomes large. However, since the power supply system according to Embodiment 7 comprises the charging section 14, the charging section 14 operates even when the resonance voltage increases, thereby reducing the on-period of the transistor Q1, thus making it possible to obviate the need of using a transistor with a large withstand voltage as the transistor Q1 and to obtain a flat output characteristic.

As so far described, according to the power supply system of Embodiment 7, it is possible to cause the power supply circuit 10 to heat the blade face 22 of the shaver in a noncontact manner. Further, since the secondary side of the resonance coil L1 is the blade face 22 made of metal, the resonance voltage will increase; however, since the charging section 14 operates thereby decreasing the on-period of the transistor Q1, no large voltage will be applied to the transistor Q1 for a long period of time thereby enabling to protect the transistor Q1. As a result, the need of using a transistor having a large withstand voltage as the transistor Q1 is obviated thereby allowing to reduce the size and cost of the circuit.

Embodiment 8

Figure 11:
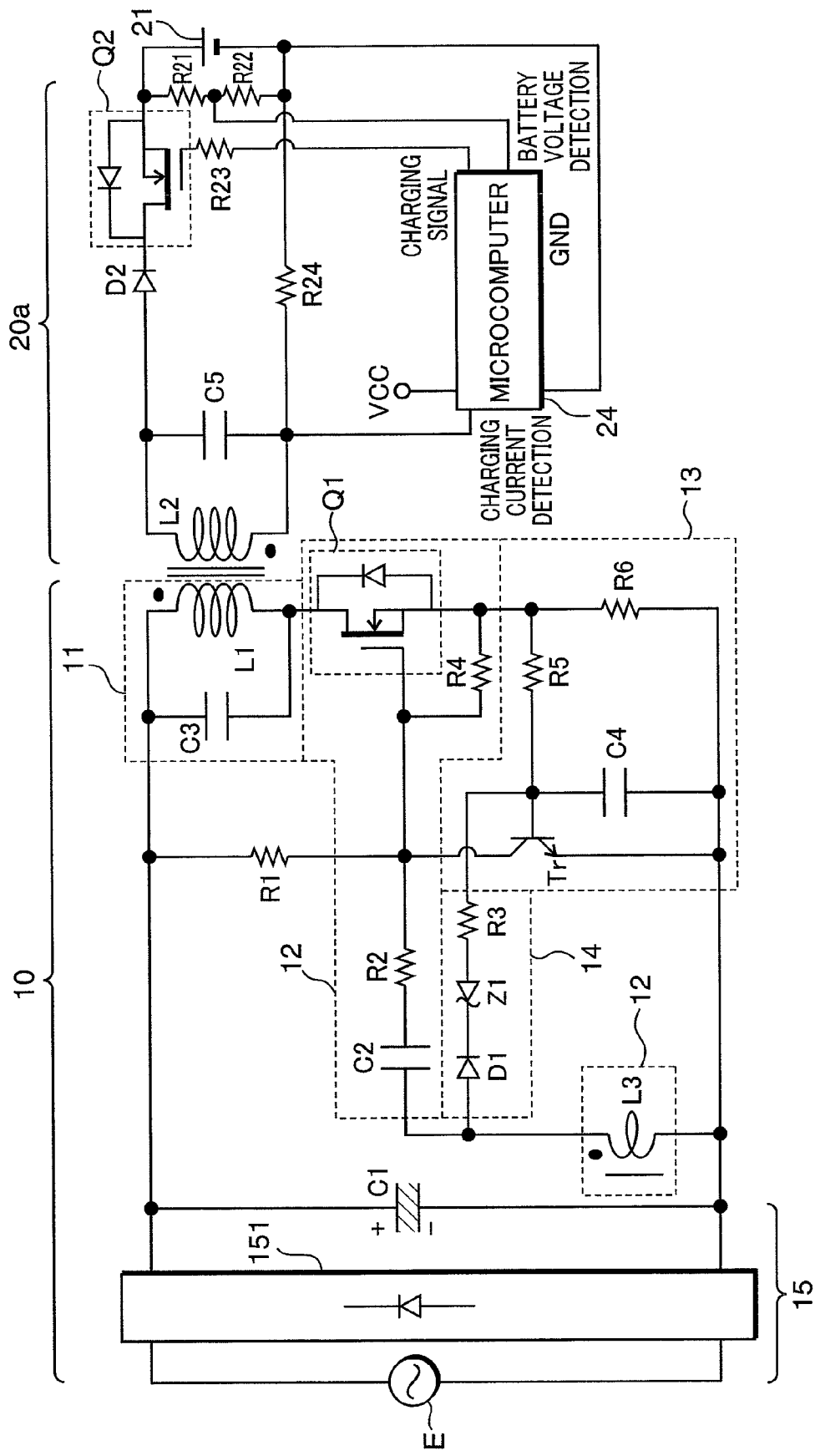
FIG. 11 is a circuit diagram of the power supply system according to Embodiment 8 of the present invention.

Next, the power supply system according to Embodiment 8 of the present invention will be described. FIG. 11 shows a circuit diagram of the power supply system according to Embodiment 8. It is noted that in FIG. 11, like parts of those of Embodiments 1 to 7 are given like reference characters and the description thereof will be omitted. The power supply system according to Embodiment 8 is characterized in that current control is performed in a load device 20a.

The load device 20a further comprises a transistor Q2, four resistors R21, R22, R23, R24, and a microcomputer 24 with respect to the load device 20 of Embodiment 1. The transistor Q2 is made up of an re-channel field effect transistor and is connected at the drain to the cathode of the diode D2 and at the source to the positive electrode of the secondary battery 21. The resistor R21 and the resistor R22 which are connected in series are connected in parallel with the secondary battery 21. The connection point of the resistor R21 and the resistor R22 is connected with the microcomputer 24. The gate of the transistor Q2 is connected to the microcomputer 24 via the resistor R23. The resistor R24 is connected between the positive terminal of the load coil L2 and the negative electrode of the secondary battery 21. The ground terminal of the microcomputer 24 is connected with the negative electrode of the secondary battery 21.

The microcomputer 24 detects the charging current which flows in the resistor R24 and outputs a pulse signal (charging signal) to the gate of the transistor Q2 such that the average value of the charging current is kept at a fixed value, thereby PWM-controlling the transistor Q2. As the result of this, the charging current is adjusted to have a fixed average value and an unstable current outputted from the power supply circuit 10 is converted into a stable current thereby enabling to accurately charge the secondary battery 21.

It is noted that in Embodiment 8, the secondary battery 21 corresponds to the load body section; the load coil L2, the diode D2, the capacitor C5, the transistor Q2, and the resistor R24 correspond to the supply section; and the microcomputer 24 corresponds to the current detection section and the control section.

Figure 12:
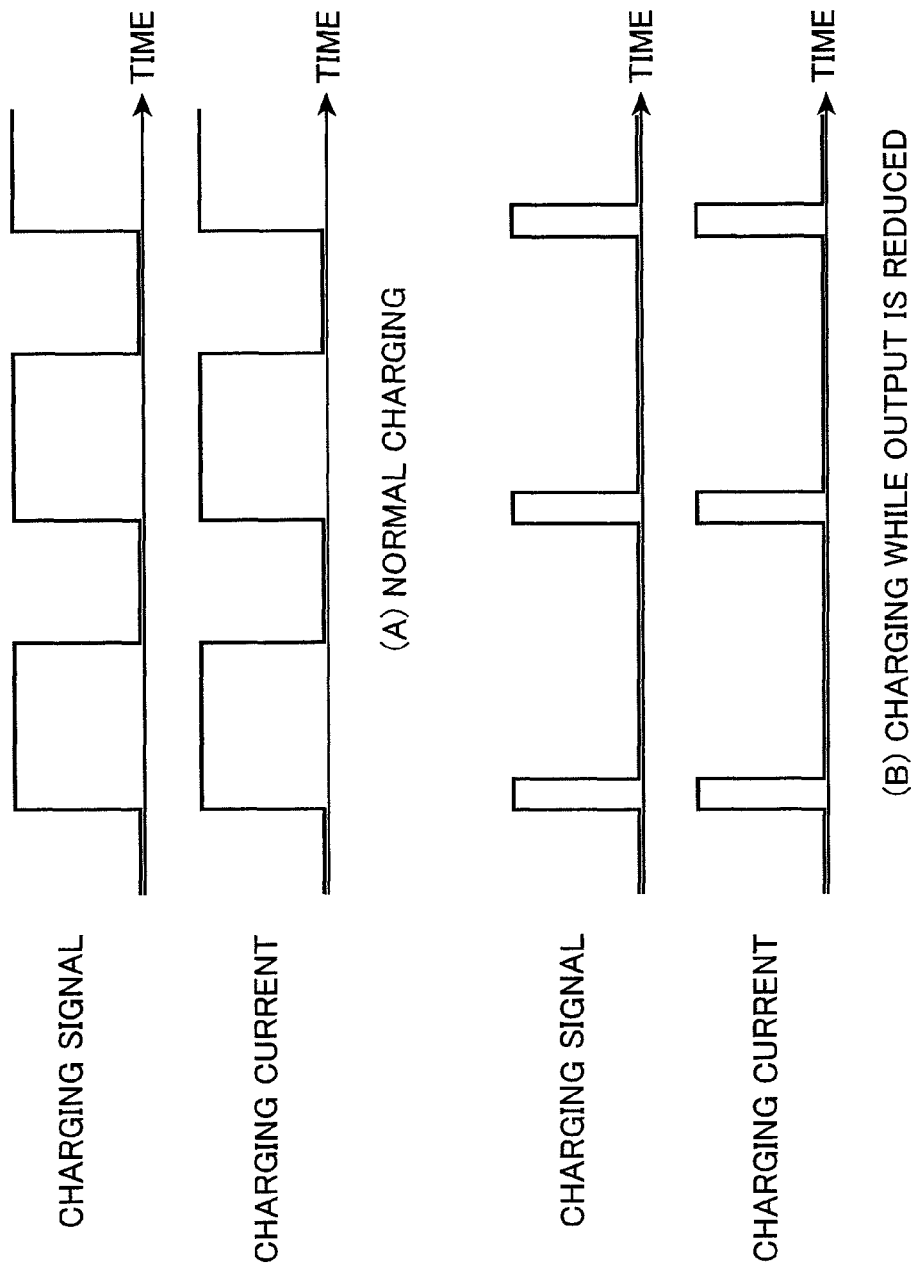
FIG. 12 is a waveform diagram of charging signal and charging current, in which (A) shows a waveform diagram of charging signal and charging current during normal charging, and (B) shows a waveform diagram when the average value of charging current is adapted to be smaller than during the normal charging (while the output is reduced)

FIG. 12 show a waveform diagram of a charging signal and a charging current, in which (A) shows a waveform diagram of the charging signal and the charging current during normal charging, and (B) shows a waveform diagram of the charging signal and the charging current when the average value of the charging current is lowered than during normal charging (when output is reduced).

It is seen in both (A) and (B) of FIG. 12 that when the charging signal becomes a high level, the transistor Q2 is turned on and a fixed amount of charging current flows, and when the charging signal becomes a low level, the transistor Q2 is turned off and the charging current becomes 0. That is, microcomputer 24 can adjust the average value of the charging current by increasing the pulse width of the charging signal when increasing the average value of the charging current, and decreasing the pulse width of the charging signal when decreasing the average value of the charging current.

As so far described, according to the power supply system of Embodiment 8, since the transistor Q2, the resistors R21 to R24, and the microcomputer 24 are provided in the load device 20a, the average value of the charging current is adjusted to keep a fixed value and an unstable current outputted from the power supply circuit 10 is converted into a stable current, thereby enabling to accurately charge the secondary battery 21 and to perform the adjustments such as increasing and decreasing the average value of the charging current as well.

It is noted that although, in Embodiment 8, the microcomputer 24 controls the transistor Q2 such that the average value of the charging current is kept at a fixed value, it may control the transistor Q2 such that the charging voltage of the secondary battery 21 it kept at a fixed value.

In this case, the microcomputer 24 may control the transistor Q2 by detecting the charging voltage of the secondary battery 21 from the voltage applied to the resistors R21, R22 and adjusting the pulse width of the charging signal such that the detected charging voltage is kept at a fixed value. The control of the voltage of the secondary battery 21 to keep a fixed value will become effective when a secondary battery which requires a constant voltage charging, such as a lithium ion battery is adopted as the secondary battery 21. Further, according to the present power supply system, it is also possible for the microcomputer 24 to turn off the transistor Q2 at all times, thereby halting the charging.

Embodiment 9

Figure 13:
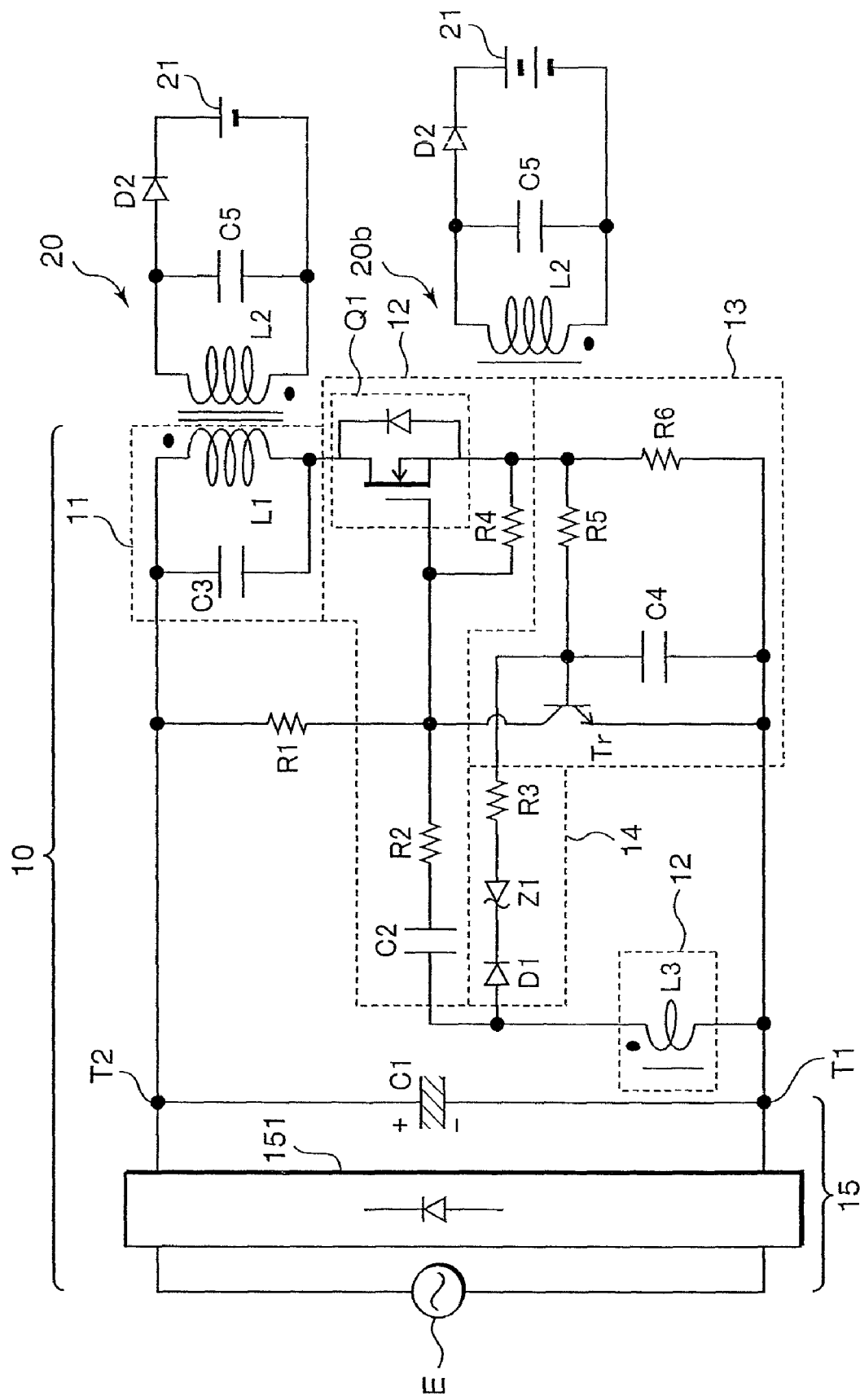
FIG. 13 is a circuit diagram of the power supply system according to Embodiment 9 of the present invention.

Next, the power supply system according to Embodiment 9 of the present invention will be described. FIG. 13 shows a circuit diagram of the power supply system according to Embodiment 9. It is noted that in FIG. 13, like parts of those of Embodiments 1 to 8 are given like reference characters and the description thereof will be omitted. The power supply system according to Embodiment 9 is characterized in that the charging current is adjusted by changing the magnitude of the capacitance of the capacitor C5 when the number of cells making up the secondary battery 21 is changed.

In the load device 20, when the relationship between the charging current flowing in the diode D2 and the capacitance of the capacitor C5 is shown with the charging current being indicated by the ordinate axis and the capacitance being indicated by the abscissa axis, the charging current varies in a hill shape exhibiting a peak at a capacitance of the capacitor C5 when the load coil L2 and the capacitor C5 resonate.

As the result of that, it is possible to control the charging current to be a target value by adjusting the capacitance of the capacitor C5.

Thus, when adopting a load device 20b comprising a secondary battery 21 having two cells in place of the load device 20 comprising the secondary battery 21 having one cell, by setting the capacitance of the capacitor C5 of the load device 20b such that the charging current is larger than in the load device 20, it becomes possible to feed a preferred amount of charging current in the load device 20b without changing the configuration of the power supply circuit 10.

It is noted that although, in Embodiment 9, the number of cells of the secondary battery 21 provided in the load device 20b is supposed to be two, this is not limiting and the number of cells of the secondary battery 21 may be three or more. In this case as well, by setting the capacitance of the capacitor C5 such that a preferred amount of charging current flows depending on the number of cells of the secondary battery 21, it becomes possible to feed a preferred amount of charging current in the load device 20b without changing the configuration of the power supply circuit 10. Moreover, the capacitance of the capacitor C5 may be set such that a preferred amount of charging current flows depending on not only the number of cells but also the kind of the secondary battery 21 such as a nickel-cadmium battery and a lithium ion battery.

As so far described, according to the power supply system of the Embodiment 9, by setting the capacitance of the capacitor C5 such that a preferred amount of charging current flows even when the number of cells of the secondary battery varies, it is made possible to feed a preferred amount of charging current in the load device 20b without changing the configuration of the power supply circuit 10.

Embodiment 10

Figure 14:
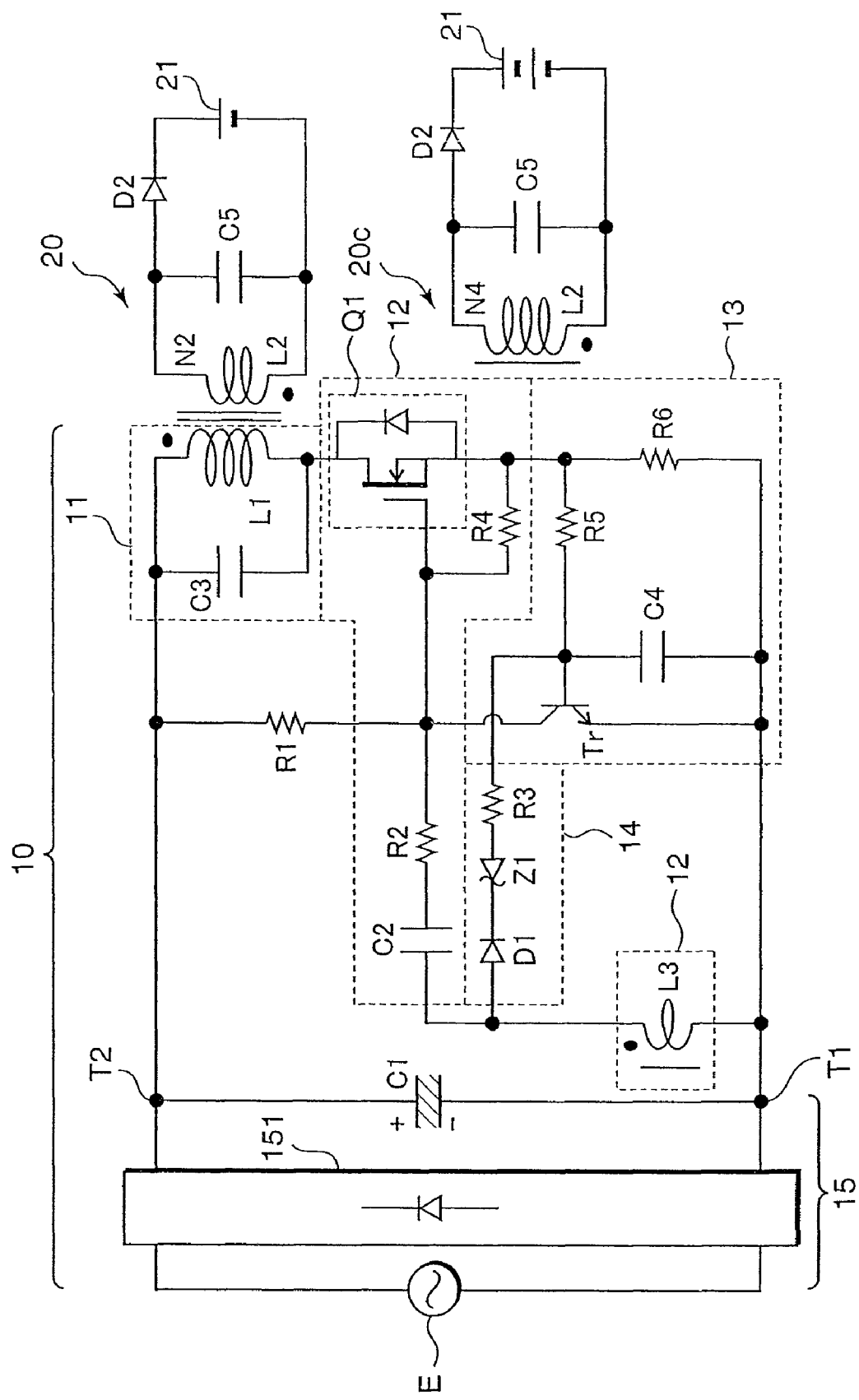
FIG. 14 is a circuit diagram of the power supply system according to Embodiment 10 of the present invention.

Next, the power supply system according to Embodiment 10 of the present invention will be described. FIG. 14 shows a circuit diagram of the power supply system according to Embodiment 10. It is noted that in FIG. 14, like parts of those of Embodiments 1 to 9 are given like reference characters and the description thereof will be omitted. The power supply system according to Embodiment 10 is characterized in that the charging current is adjusted by changing the number of windings of the load coil L2 when the number of cells making up the secondary battery 21 is changed.

In the load device 20, when the relationship between the charging current flowing in the diode D2 and the number of windings of the load coil L2 is shown with the charging current being indicated by the ordinate axis and the number of windings being indicated by the abscissa axis, the charging current varies in a hill shape exhibiting a peak at a number of windings of the load coil L2 when the load coil L2 and the capacitor C5 resonate.

As the result of this, it is possible to control the charging current to be a target value by adjusting the number of windings of the load coil L2.

Thus, when adopting a load device 20c comprising a secondary battery 21 having two cells in place of the load device 20 comprising the secondary battery 21 having one cell, by setting the number of windings of the load coil L2 such that the charging current is larger than that in the load device 20, it becomes possible to flow a preferred amount of charging current in the load device 20c without changing the configuration of the power supply circuit 10.

It is noted that although, in Embodiment 10, the number of cells of the secondary battery 21 included in the load device 20c is supposed to be two, this is not limiting and the number of cells of the secondary battery 21 may be three or more. In this case as well, by setting the number of windings of the load coil L2 such that a preferred amount of charging current flows depending on the number of cells of the secondary battery 21, it becomes possible to feed a preferred amount of charging current in the load device 20b without changing the configuration of the power supply circuit 10. Moreover, the number of windings of the load coil L2 may be set such that a preferred amount of charging current flows depending on not only the number of cells but also the kind of the secondary battery 21 such as a nickel-cadmium battery and a lithium ion battery.

As so far described, according to the power supply system of the Embodiment 10, by setting the number of windings of the load coil L2 such that a preferred amount of charging current flows even when the number of cells of the secondary battery 21 varies, it is made possible to feed a preferred amount of charging current in the load device 20c without changing the configuration of the power supply circuit 10.

Embodiment 11

Figure 15:
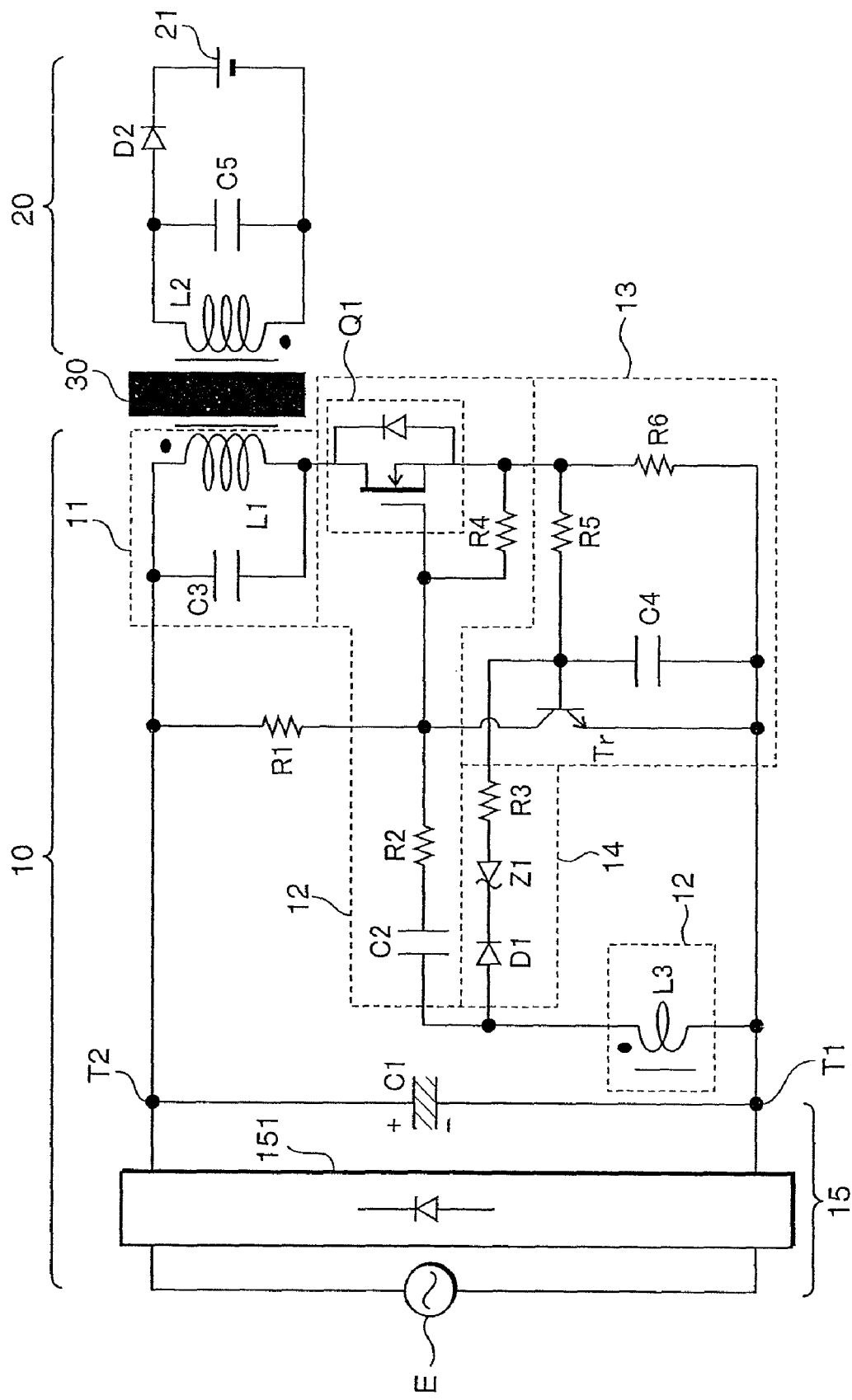
FIG. 15 is a circuit diagram of the power supply system according to Embodiment 11 of the present invention.
Figure 16:
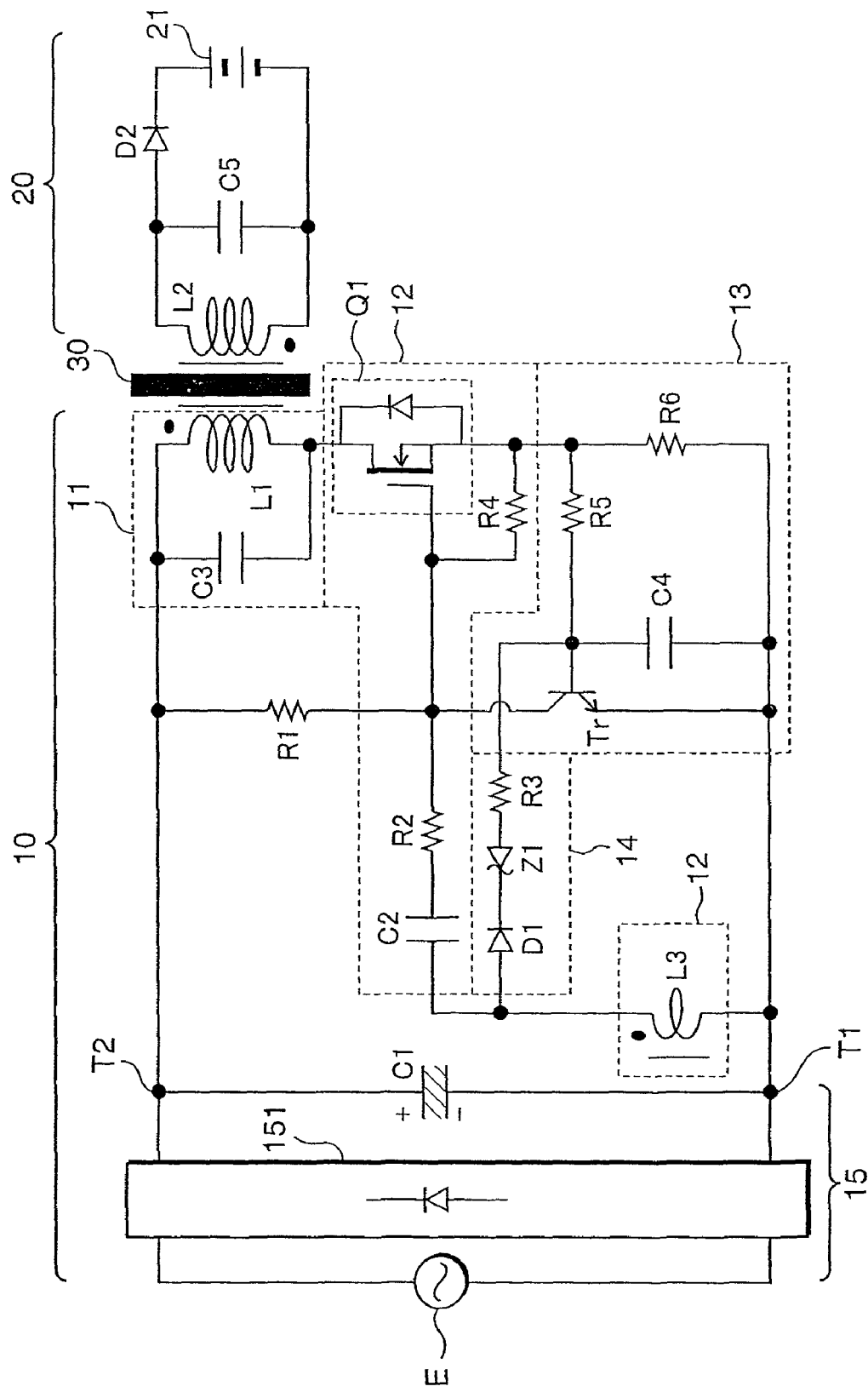
FIG. 16 is a circuit diagram of the power supply system according to Embodiment 11 of the present invention.
Figure 17:
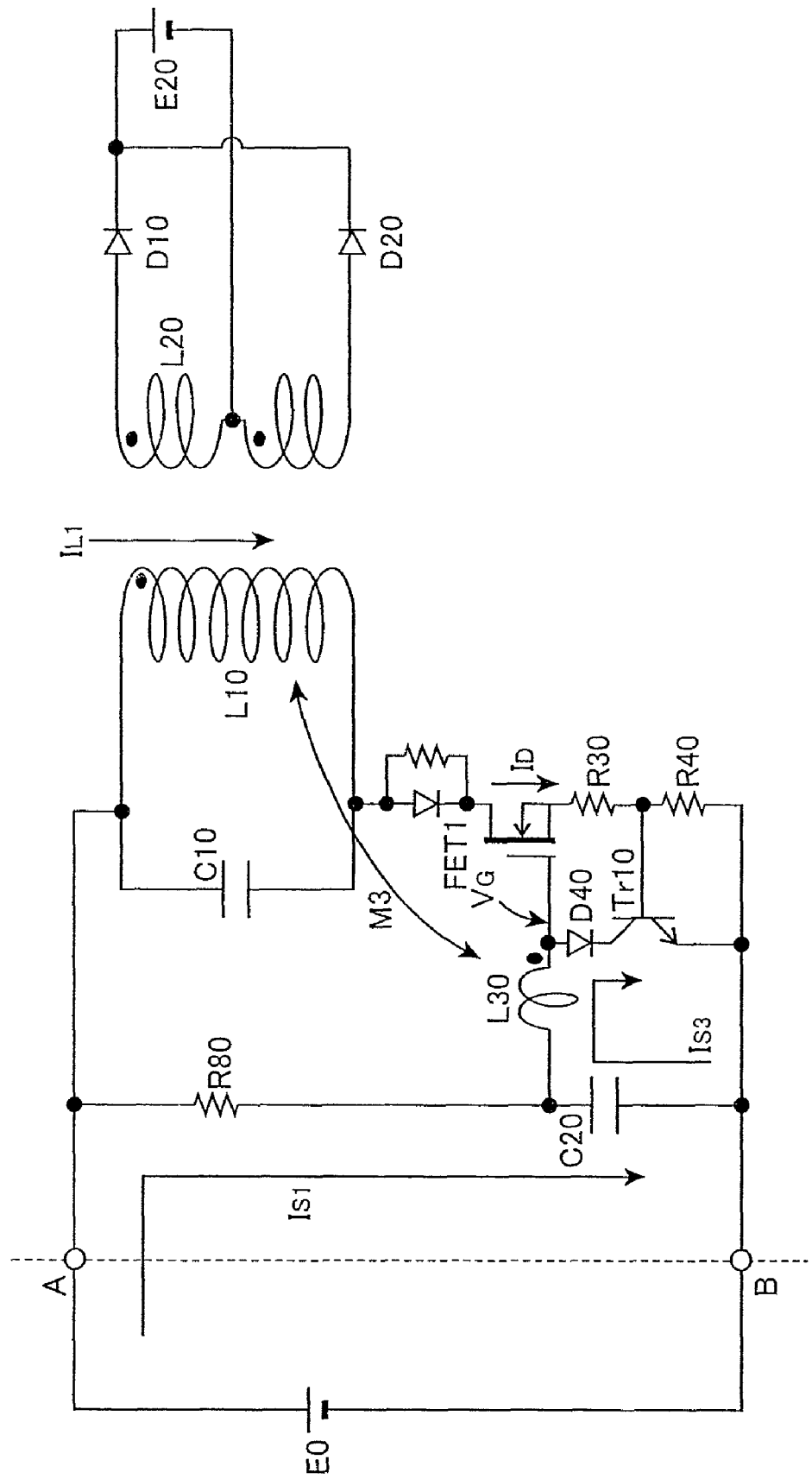
FIG. 17 is a circuit diagram to show a conventional power supply apparatus described in Patent Document 1.

Next, the power supply system according to Embodiment 11 of the present invention will be described. FIGS. 15 and 16 show circuit diagrams of the power supply system according to Embodiment 11. It is noted that in FIGS. 15 and 16, like parts of those of Embodiments 1 to 10 are given like reference characters and the description thereof will be omitted. The power supply system according to Embodiment 11 is characterized in that the charging current to be passed through the diode D2 is adjusted by varying the distance between the resonance coil L1 and the load coil L2.

Since increasing the distance between the resonance coil L1 and the load coil L2 will increase leakage flux, the power transmitted to the load device 20 will decrease, resulting in a decrease in charging current. On the other hand, decreasing the distance between the resonance coil L1 and the load coil L2 will decrease the leakage flux, the power transmitted to the load device 20 will increase, resulting in an increase in charging current. Therefore, it is possible to adjust the amount of charging current by adjusting the thickness of the housing 30.

While the number of cells of the secondary battery 21 of the load device 20 shown in FIG. 15 is one, the number of cells of the secondary battery 21 of the load device 20 shown in FIG. 16 is two. Therefore, it is preferable to configure that the amount of charging current to be passed through the load device 20 shown in FIG. 16 is larger than that to be passed through the load device 20 shown in FIG. 15.

In this regard, in the power supply system shown in FIG. 16, the thickness of the housing 30 is set such that the distance between the resonance coil L1 and the load coil L2 is smaller than in the power supply system shown in FIG. 15. As the result of this, more charging current flows in the load device 20 in the power supply system shown in FIG. 16 than in that shown in FIG. 15.

As so far described, according to the power supply system of Embodiment 11, by setting the thickness of the housing such that a preferred amount of charging current flows even when the number of cells of the secondary battery 21 changes, it is made possible to feed a preferred amount of charging current in the load device 20 without changing the configuration of the power supply circuit 10.

It is noted that although the number of cells of the secondary battery 21 shown in FIG. 16 is two, the number of cells may be three or more. In such a case, by adjusting the thickness of the housing such that a preferred amount of charging current flows depending on the number of cells, it is made possible to feed a preferred amount of charging current to the load device 20 without changing the configuration of the power supply circuit 10. Further, the thickness of the housing 30 may be adjusted such that a preferred amount of charging current flows depending on not only the number of cells but also the kind of the secondary battery 21 such as a nickel-cadmium battery and a lithium ion battery.

SUMMARY OF THE INVENTION (1) The power supply circuit according to the present invention is configured to self-oscillate by supply of power from a power supply section, the power supply circuit being characterized by comprising: a resonance section including a resonance capacitor and a resonance coil, and for supplying power to the load device; an oscillation section including a first switching element connected in series to the resonance section and a feedback coil magnetically coupled to the resonance coil, and for turning on and off the first switching element to cause the resonance section to self-oscillate; a turn-off section including a second switching element, and a turn-off capacitor connected between a control terminal of the second switching element and a negative electrode of the power supply section, in which when an on-current which flows when the first switching element turns on reaches a predetermined level, the second switching element turns on to cause the first switching element to turn off; and a first charging section including a diode of which anode is connected to the feedback coil side, and a zener diode of which cathode is connected to the cathode of the diode and of which anode is connected to the turn-off capacitor side.

According to this configuration, there is provided a first charging section including a diode for blocking the flow of current toward the feedback coil from the turn-off capacitor, and a zener diode which operates when the voltage of the feedback coil exceeds a fixed value, between the feedback coil and the turn-off capacitor. Therefore, when a large voltage is outputted from the power supply section, the voltage of the feedback coil will exceed a fixed value and the first charging section will operate to supply a current to the turn-off capacitor. By this configuration, the turn-off capacitor will be charged with an on-current of the first switching element and a current supplied from the first charging section during an on-period of the first switching element, thus enabling to quickly turn on the second switching element and quickly turn off the first switching element. As a result, the on-period of the first switching element is decreased and thereby the energy stored in the resonance section is reduced, enabling to suppress an increase of the output current to be fed to the load device. This makes it possible to obtain a flat output characteristic, which indicates the relationship between the voltage outputted from the power supply section and the output current to be fed to the load device with the output voltage being represented by the abscissa axis and the output current being represented by the ordinate axis, thus enabling to provide a worldwide applicable power supply circuit.

Further, since when the voltage outputted from the power supply section is high, the turn-off capacitor will be quickly charged by the operation of the first charging section, the on-period of the first switching element decreases thus enabling to prevent an excessive voltage from being applied to the first switching element.

Further, since the first charging section comprises a diode for blocking the current flowing from the turn-off capacitor toward the feedback coil, the charge quantity to be stored in the turn-off capacitor when the first switching element turns on is made to be constant and thereby the charging time of the turn-off capacitor becomes constant, enabling to maintain the on-period of the first switching element to be constant thereby supplying stable power to the load device.

(2) The above described first charging section preferably includes a resistor which is connected at one end to the anode of the above described zener diode and at the other end to the above described turn-off capacitor.

According to this configuration, it is possible to adjust the gradient of the output characteristic by adjusting the value of the resistor.

(3) It is preferable to provide a second charging section for charging the above described turn-off capacitor aside from the above described first charging section.

According to this configuration, since the turn-off capacitor is charged from the second charging section as well in addition to from the first charging section, it is possible to cause the second switching element to turn on more quickly thereby decreasing the on-period of the first switching element.

(4) It is preferable that the above described second charging section is provided in multiple numbers.

According to this configuration, it is possible to adjust the value of the output current to be passed through the load device by adjusting the number of the second charging sections.

(5) It is preferable that the above described second charging section is connected in parallel with the above described first charging section and is made up of a smoothing section for smoothing the voltage of the above described feedback coil.

According to this configuration, since the voltage of the feedback coil is smoothed by the smoothing section, it is made possible to remove the variation of the voltage due to the effect of ripples of the voltage outputted from the power supply section, and to stabilize the oscillation at the oscillation section.

(6) The above described second charging section is preferably made up of a resistor which is connected between the positive electrode of the above described power supply section and the control terminal of the above described second switching element.

According to this configuration, it is possible to make up the second charging section with a simple configuration utilizing a resistor alone.

(7) It is preferable that the above described first charging section is proved in parallel in multiple numbers, and each zener diode provided in each first charging section has a different breakdown voltage respectively.

According to this configuration, since zener diodes each of which has a different breakdown voltage are utilized, it is possible to obtain a flatter output characteristic.

(8) The power supply system of the present invention is a power supply system comprising a power supply circuit and a load device according to any of items (1) to (7), characterized in that the above described load device comprises a magnetic coupler which is coupled with the above described resonance coil via an insulation member.

According to this configuration, although when the load device is removed, the resonance coil as a whole becomes a leakage inductance and the voltage applied to the first switching element increases, since the on-period of the first switching element is decreased by the operation of the charging section, it is possible to prevent an excessive voltage from being applied to the first switching element and to reduce the reactive current which flows in the power supply circuit, thereby reducing the standby power.

(9) It is preferable that the above described magnetic coupler is made of metal and the above described power supply circuit generates an eddy current in the above described metal to heat it.

According to this configuration, since a magnetic flux from the resonance coil is interlinked with the metal included in the load device and an eddy current is generated therein to heat the metal, the power supply circuit can be used as the heating apparatus. Further, although when the load device is removed from the power supply circuit and there is no metal, the load becomes open and consequently the resonance coil as a whole becomes a leakage inductance and the voltage applied to the switching element increases, since the on-period of the switching element is decreased by the operation of the first charging section, it is possible to prevent an excessive voltage from being applied to the switching element and to reduce a reactive current which flows in the power supply circuit thereby reducing the standby power.

(10) The above described load device preferably comprises: a supply section including a load body section and a load coil magnetically coupled with the resonance coil and for supplying a current generated in the load coil to the load body section; a current detection section for detecting a current supplied to the load body section; and a control section for performing the control that the current detected by the current detection section is kept at a fixed value.

According to this configuration, since a current which flows in the load body section is detected and the supply section is controlled such that the aforementioned current is kept at a fixed value, it becomes possible to supply a stable current to the load body section without changing the configuration of the power supply circuit, thereby enabling a cost reductions and miniaturization as the power supply system as a whole.

The invention claimed is:

1. A power supply circuit configured to self-oscillate by supply of power from a power supply section, the power supply circuit being comprising:
   a resonance section including a resonance capacitor and a resonance coil, and adapted for supplying power to a load device;
   an oscillation section including a first switching element connected in series to said resonance section and a feedback coil magnetically coupled to said resonance coil, and adapted for turning on and off said first switching element to cause said resonance section to self-oscillate;
   a turn-off section including a second switching element and a turn-off capacitor connected between a control terminal of said second switching element and a negative electrode of the power supply section, wherein when an on-current which flows when said first switching element turns on reaches a predetermined level, said second switching element turns on to cause said first switching element to turn off; and
   a first charging section including a diode of which an anode is connected to said feedback coil side, and a zener diode of which a cathode is connected to a cathode of said diode and of which an anode is connected to said turn-off capacitor side,
   wherein said zener diode is operated when a voltage larger than a fixed value is outputted from the power supply section to charge said turn-off capacitor,
   wherein said first charging section is connected in parallel and in multiple numbers, and
   wherein each zener diode provided in each first charging section has a different breakdown voltage respectively.

2. The power supply circuit according to claim 1, wherein said first charging section includes a resistor, said resistor being connected at one end to an anode of said zener diode and at the other end to said turn-off capacitor.

3. The power supply circuit according to claim 2, further comprising a second charging section for charging said turn-off capacitor, aside from said first charging section.

4. The power supply circuit according to claim 3, wherein said second charging section is provided in multiple numbers.

5. The power supply circuit according to claim 4, wherein said second charging section is connected in parallel with said first charging section, and includes a smoothing section for smoothing the voltage of said feedback coil.

6. The power supply circuit according to claim 4, wherein said second charging section includes a resistor connected between a positive electrode of said power supply section and a control terminal of said second switching element.

7. A power supply system, comprising a power supply circuit and a load device according to claim 1, wherein
said load device comprises a magnetic coupler which is magnetically coupled with said resonance coil via an insulation member.

8. The power supply system according to claim 7, wherein said magnetic coupler is made of a metal, and
said power supply circuit generates an eddy current in said metal to heat the same.

9. The power supply system according to claim 8, wherein said load device comprises:
a load body section;
a supply section including a load coil magnetically coupled with said resonance coil, and adapted for supplying a current generated at said load coil to said load body section;
a current detection section for detecting a current supplied to said load body section; and
a control section for controlling said supply section such that the current detected by said current detection section is kept at a fixed value.

10. The power supply system according to claim 7, wherein said load device comprises:
a load body section;
a supply section including a load coil magnetically coupled with said resonance coil, and adapted for supplying a current generated at said load coil to said load body section;
a current detection section for detecting a current supplied to said load body section; and
a control section for controlling said supply section such that the current detected by said current detection section is kept at a fixed value.

11. The power supply circuit according to claim 1, further comprising a second charging section for charging said turn-off capacitor, aside from said first charging section.

12. The power supply circuit according to claim 11, wherein said second charging section is provided in multiple numbers.

13. The power supply circuit according to claim 12, wherein said second charging section is connected in parallel with said first charging section, and includes a smoothing section for smoothing the voltage of said feedback coil.

14. The power supply circuit according to claim 12, wherein said second charging section includes a resistor connected between a positive electrode of said power supply section and a control terminal of said second switching element.

15. The power supply circuit according to claim 11, wherein said second charging section is connected in parallel with said first charging section, and includes a smoothing section for smoothing the voltage of said feedback coil.

16. The power supply circuit according to claim 11, wherein said second charging section includes a resistor connected between a positive electrode of said power supply section and a control terminal of said second switching element.

* * * * *